United States Patent
Furuyama et al.

(10) Patent No.: US 6,611,803 B1
(45) Date of Patent: Aug. 26, 2003

(54) METHOD AND APPARATUS FOR RETRIEVING A VIDEO AND AUDIO SCENE USING AN INDEX GENERATED BY SPEECH RECOGNITION

(75) Inventors: Hiroshi Furuyama, Tokyo (JP); Hitoshi Yashio, Tokyo (JP); Ikuo Inoue, Yokohama (JP); Mitsuru Endo, Kawasaki (JP); Masakatsu Hoshimi, Zama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/600,881

(22) PCT Filed: Dec. 14, 1999

(86) PCT No.: PCT/JP99/07022

§ 371 (c)(1),
(2), (4) Date: Aug. 14, 2000

(87) PCT Pub. No.: WO00/36833

PCT Pub. Date: Jun. 22, 2000

(30) Foreign Application Priority Data

Dec. 17, 1998 (JP) .......................... 10-359414
Dec. 13, 1999 (JP) .......................... 11-352819

(51) Int. Cl.⁷ .......................... G10L 19/00; G10L 15/26
(52) U.S. Cl. .......................... 704/254; 704/500; 704/235
(58) Field of Search .......................... 704/254, 231, 704/235, 500

(56) References Cited

U.S. PATENT DOCUMENTS

| | | | | |
|---|---|---|---|---|
| 4,987,596 A | * | 1/1991 | Ukita | 704/239 |
| 5,473,726 A | * | 12/1995 | Marshall | 704/231 |
| 5,710,591 A | * | 1/1998 | Bruno et al. | 348/14.09 |
| 5,774,859 A | | 6/1998 | Houser et al. | 704/275 |
| 5,806,036 A | | 9/1998 | Stork | 704/260 |
| 5,835,667 A | | 11/1998 | Wactlar | 386/96 |
| 6,505,153 B1 | * | 1/2003 | Van Thong et al. | 704/211 |

FOREIGN PATENT DOCUMENTS

| | | | |
|---|---|---|---|
| DE | 4436692 | 4/1995 | .............. 704/232 |
| JP | 3-53379 | 3/1991 | |
| JP | 5-108727 | 4/1993 | |
| JP | 6-68168 | 3/1994 | |
| JP | 9-134194 | 5/1997 | .............. 704/260 |
| JP | 10172245 | 6/1998 | |

OTHER PUBLICATIONS

James, D. A. and S. J. Young, "A Fast Lattice-Based Approach to Vocabulary Independent Wordspotting," Proc. ICASSP 94, Adelaide, vol. 1, pp. 377–380, 1994.*
English Language Abstract of JP 5–108727.
English Language Abstract of JP 10–172245.
*Joho kagaku koza E•19•3 Onsei Ninshiki*, pp. 90–93, Yasunaga Niimi, Kyoritsu Shuppan K.K. (Japan) (Oct. 10, 1979), with a partial English language Translation.

(List continued on next page.)

Primary Examiner—Marsha D. Banks-Harold
Assistant Examiner—Donald L. Storm
(74) Attorney, Agent, or Firm—Greenblum & Bernstein, P.L.C.

(57) ABSTRACT

A video retrieval apparatus includes a retrieval data generator that is configured to extract a characteristic pattern from a voice signal synchronous with a video signal to generate an index for video retrieval. The video retrieval apparatus also includes a retrieval processor that is configured to input a key word from a retriever and collate the key word with the index to retrieve a desired video. The retrieval data generator includes a multiplexor that is configured to multiplex video signals, voice signals and indexes to output in data stream format. The retrieval processor includes a demultiplexor that is configured to demultiplex the multiplexed data stream into the video signals, the voice signals and the indexes. A video reproduction apparatus may collate a visual pattern of the key word visual pattern data of the video signal at the time a person vocalizes a sound as the index for retrieval.

12 Claims, 11 Drawing Sheets

OTHER PUBLICATIONS

*Development of a Video Retrieval System by Automatic Speech Recognition and Meta–data Technology,* Hiroshi Furuyama et al., Technical Report of IEICE (Institute of Electronics, Information, and Communication Engineers), IE99–2 PRMU99–46, MVE99–42, Jul. 1997, with English language Abstract.

"Acoustic Indexing for Multimedia Retrieval and Browsing", S.J. Young et al., Acoustics, Speech, and Signal Processing, 1997 IEEE International Conference on Munich, Germany, Apr. 21–24, 1997.

"Phonetic Recognition for Spoken Document Retrieval", K. Ng et al., Acoustics, Speech and Signal Processing, 1998, pp. 325–328 proceedings of the 1998 IEEE International Conference on Seatlle, Washington, USA, May 12–15, 1998.

"Vision: A Digital Video Library", W. Li et al., proceedings of the ACM International Conference on Digital Libraries, XX, XX, Mar. 20, 1996, pp. 19–27.

"Audio–to–Visual Conversion for Multimedia Communication", R. R. Rao et al., IEEE Transactions on Industrial Electronics, IEEE Inc., New York, US, vol. 45, No. 1, Feb. 1, 1998, pp. 15–22.

"Aspects of Multimedia Retrieval", M. Abdel–Mottaleb et al., Philips Journal of Research, Elsevier, Amsterdam, NL, vol. 50, No. 1, 1996, pp. 227–251.

Proceedings ACM Multimedia 1996, Nov. 18–22, 1996, pp. 307–315, with an English Language Translation.

* cited by examiner

| No. | PHONEME SIGN | VOICE CHARACTERISTIC PATTERN (VECTOR DATA) |
|---|---|---|
| 1 | A | |
| 2 | O | |
| 3 | U | |
| 4 | I | |
| 5 | E | |
| ⋮ | ⋮ | ⋮ |
| 498 | KjA | |
| 499 | KjU | |
| 500 | AJ | |

FIG. 3

CV/VC LATTICES PICKED UP
FOR "SORA"

CONNECTION OF CV/VC LATTICES

METHOD AND APPARATUS FOR RETRIEVING A VIDEO AND AUDIO SCENE USING AN INDEX GENERATED BY SPEECH RECOGNITION

TECHNICAL FIELD

The present invention relates to a video retrieval apparatus and method capable of retrieving a desired scene (video and/or voice) using a key word.

BACKGROUND ART

Recently rapidly popularized computer networks represented by multi-channel broadcast and the internet distribute a huge amount of videos to societies including homes. Meanwhile increased recording medium capacity enables a large amount of video signals to be stored in the homes. This phenomenon requires techniques for retrieving a video scene that a user desires from the large number of video signals easily and with high accuracy.

Conventionally considered methods are a method that detects a changing point of video signals from a variation of the video signals to display a video scene according to the point, and retrieval systems such as a method that detects a particular scene comprised of particular objects to display using an image recognition technique. However there is a problem that in these retrieval systems, a user's purpose of retrieving is not always reflected on a retrieved scene accurately.

Further there is a retrieval system that reads subtitle information and closed caption information that American broadcast adopts from videos by character recognition to retrieve a particular scene. This system enables a user to acquire the scene on which the user's purpose of retrieving is reflected accurately in scenes well-adopting the subtitle information and closed caption. However, since such information is limited to part of broadcast programs because the information needs to be inserted manually, it is difficult to widely apply the information to general videos.

On the other hand, it is expected that using as a key word voice information accompanying videos achieves a retrieval system that reflects a retrieval purpose accurately. Unexamined Japanese Patent Publication HEI6-68168 discloses a video retrieval system that retrieves a desired scene using a voice key word.

FIG. 1 illustrates a functional block diagram of the retrieval system disclosed in above-mentioned Unexamined Japanese Patent Publication HEI6-68168. Voice/video input section 201 receives a voice signal and video signal, voice signal storage section 202 stores the received voice signal, and video signal storage section 203 stores the received video signal. Voice analysis section 204 analyzes the voice signal to generate sequence of characteristic parameters representative of characteristics of the voice. Voice characteristic storage section 205 stores the generated sequence of characteristic parameters.

Meanwhile a key word for a user to use in a scene retrieval later is provided in the form of a voice to key word characteristic analysis section 206. Key word characteristic analysis section 206 analyzes the voice as the key word to generate sequence of characteristic parameters representative of characteristics of the key word. Key word characteristic parameter storage section 207 stores the generated sequence of characteristic parameters.

Key word interval extraction section 208 compares the sequence of characteristic parameters of the voice signal stored in the storage section 202 with the sequence of characteristic parameters of the key word voice, and extracts a key word interval in the voice signal. Index addition section 209 generates index position data 210 that relates the extracted key word interval to a frame number of the video signal corresponding to the voice signal.

When a retrieval is performed using index position data 210, it is possible to designate the frame number of the video signal in which the key word appears using the voice signal, thereby enabling video/voice output section 211 to output a corresponding video and voice, and consequently to present the user desired video and voice.

However there is a problem that it is necessary to register in advance a voice key word to be used in a retrieval, and that it is not possible to retrieve using other key words. In particular, a user input uncertain key word results in a retrieval error, and thereby it is not possible to retrieve a scene reflecting a retrieval purpose accurately.

DISCLOSURE OF INVENTION

The present invention is carried out in view of foregoing. It is an object of the present invention to provide an apparatus and method capable of retrieving a scene that a user desires in retrieving a video and/or voice, using an out-of-vocabulary word other than words and key words that are registered in advance for example, in a dictionary, and an uncertain key word that the user inputs.

The present invention provides a scene retrieval system which applies a series of voice recognition processing procedures separately to generation of retrieval data and retrieval processing, and thereby which is capable of retrieving a video/voice scene that a user desires with high speed, and reproducing the scene with high speed.

Further it is designed to generate sequence of a score of a subword, which is an intermediate result of the voice recognition processing, as a retrieval index in generating retrieval data, and to convert an input key word into time series of subword to collate with the retrieval index in retrieval processing.

Therefor it is not necessary to collate with a word dictionary or a retrieval key word registered in advance, and thereby the problem, so-called out-of-vocabulary word problem, is solved that it is not possible to cope with an unregistered key word. Further it is possible to retrieve a video/voice scene with the highest reliability even when a user inputs an uncertain key word.

Moreover the sequence of the score of the subword that is the retrieval index is multiplexed in a data stream along with the video signal and voice signal, whereby it is possible to transmit the retrieval index through broadcast networks and communication networks such as the internet.

The subword is a basic unit of an acoustic model that is smaller than a single word. Examples of the subword is a phoneme, syllable such as consonant-vowel and vowel-consonant-vowel, and demisyllable. Each word is represented as a sequence of subwords.

BRIEF DESCRIPTION OF DRAWINGS

FIG. 3 is a data structure diagram of a standard voice pattern;

FIG. 8(2) is a structure diagram of a video stream;

FIG. 8(3) is a structure diagram of GOP;

FIG. 8(4) is a structure diagram of a retrieval data stream;

BEST MODE FOR CARRYING OUT THE INVENTION

Embodiments of the present invention are explained below with reference to accompanying drawings.

First Embodiment

Figure 1:
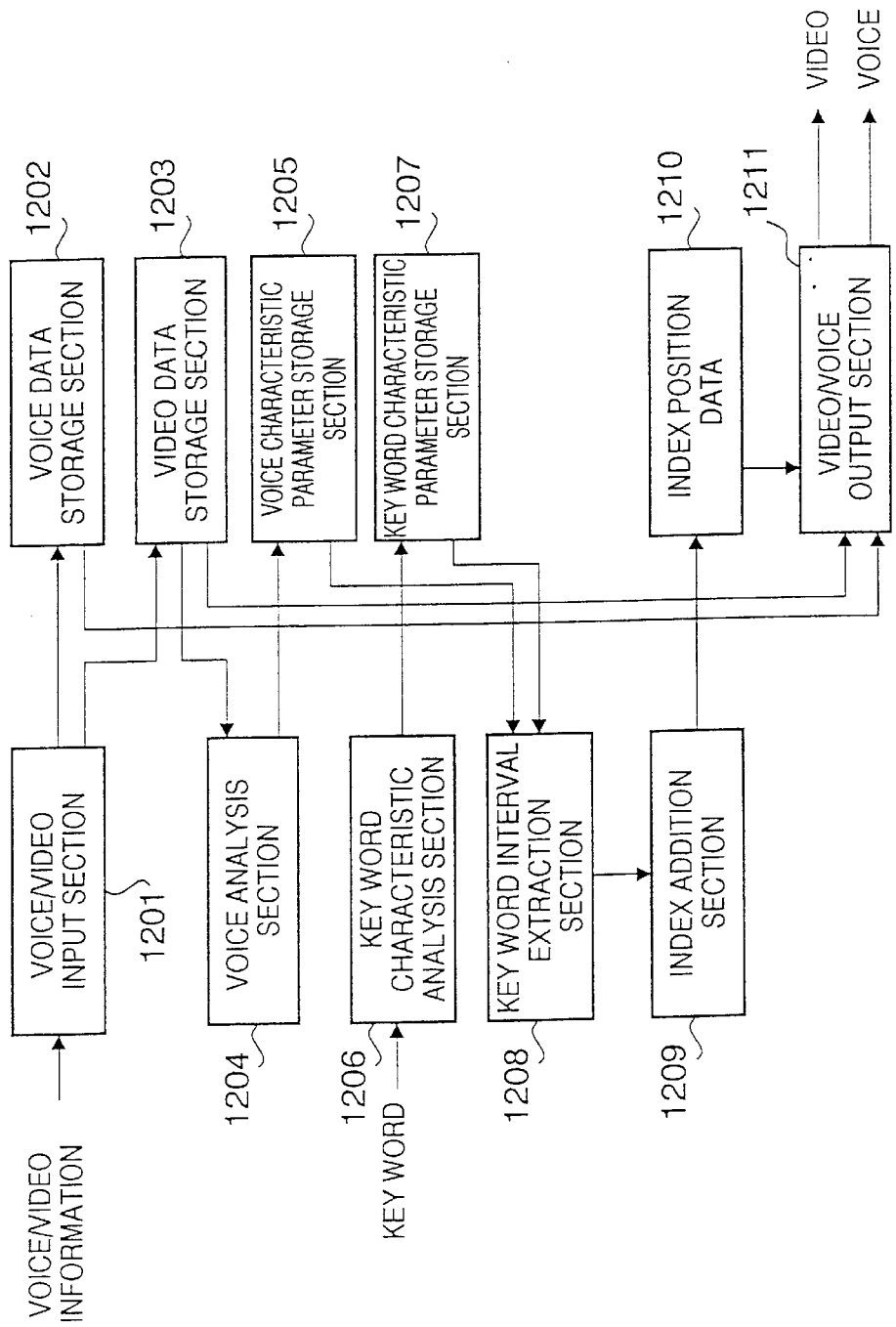
FIG. 1 is a functional block diagram of a current video retrieval system.
Figure 2:
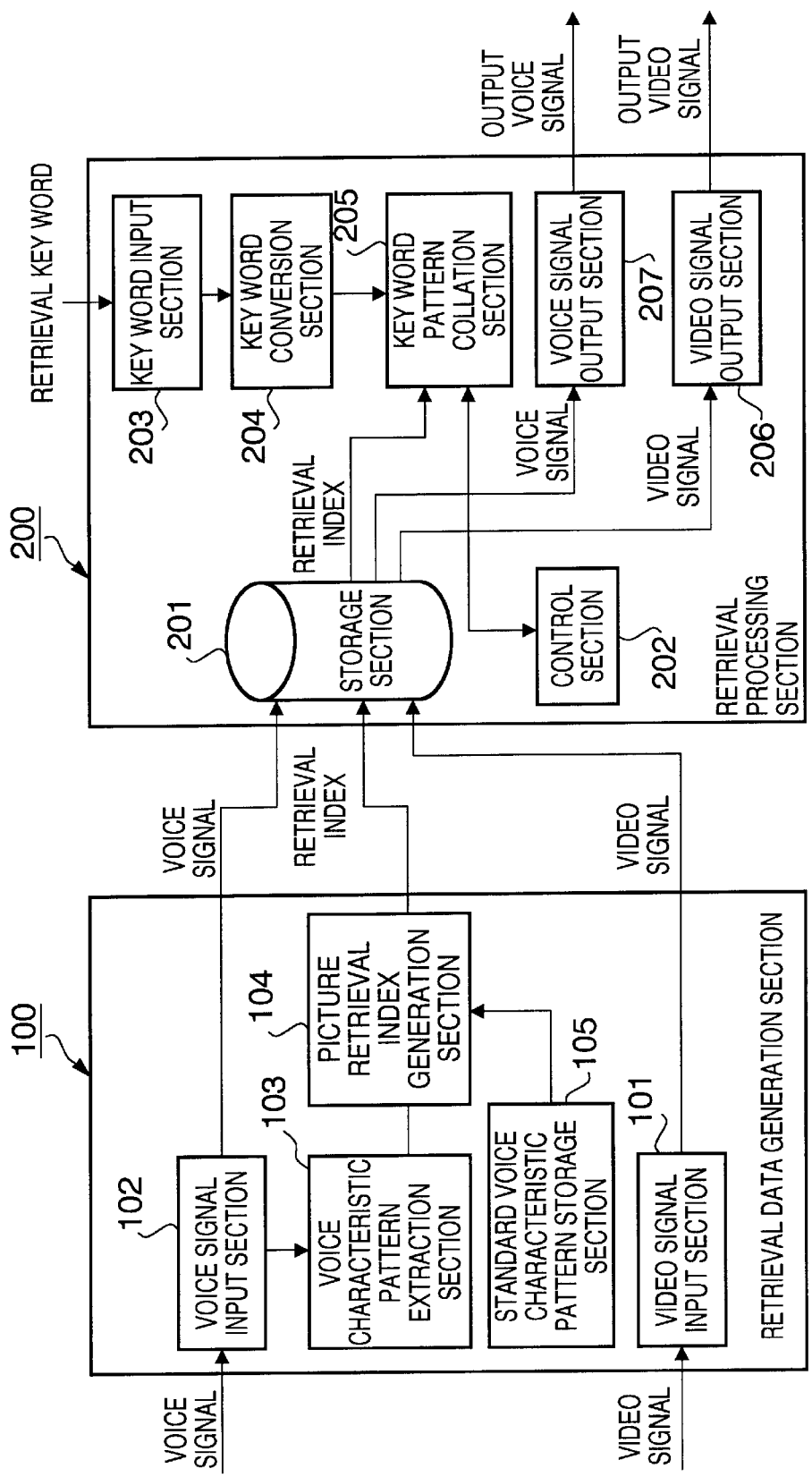
FIG. 2 is a functional block diagram of a scene retrieval system according to a first embodiment of the present invention.

FIG. 2 is a functional block of a scene retrieval system according to the first embodiment of the present invention. The scene retrieval system of this embodiment has retrieval data generation section 100 that generates a video retrieval index for use in retrieving a desired scene from among stored images, and retrieval processing section 200 that collates an input retrieval key word with the video retrieval index to retrieve a scene reflecting a retrieval purpose accurately.

Retrieval data generation section 100 has video signal input section 101 that receives a video signal, and voice signal input section 102 that receives a voice signal accompanying (synchronous with) the video signal. Storage section 201 provided in retrieval processing section 200 stores the video signal and voice signal respectively input from video signal input section 101 and voice signal input section 102. The voice signal input from voice signal input section 102 is further input to voice characteristic pattern extraction section 103. Voice characteristic pattern extraction section 103 analyzes the voice signal to extract a voice characteristic pattern. The extracted voice characteristic pattern is provided to video retrieval index generation section 104. Video retrieval index generation section 104 compares the extracted voice characteristic pattern with a standard voice pattern stored in standard voice characteristic pattern storage section 105, and outputs a group of a beginning, ending time and score indicative of a similarity of a best-matching subword, as a video retrieval index. The video retrieval index is stored in storage section 201 in retrieval processing section 200.

Retrieval processing section 200 has storage section 201 that stores video signals, voice signals and video retrieval indexes. Storage section 201 has a phoneme similarity table formed with the video retrieval indexes. The phoneme similarity table will be described later. Control section 202 controls read positions of the video signals and voice signals stored in storage section 201. Key word input section 203 inputs a retrieval key word for use in retrieving a desired video scene from among videos stored in storage section 201. Key word conversion section 204 converts the input key word into time series of the subword composing the input key word. Key word pattern collation section 205 fetches the video retrieval index matching the subword of the input key word from storage section 201. The section 205 reconstructs the retrieval key word using the video retrieval index fetched from storage section 201, and calculates a score of each of the reconstructed key words. Based on a beginning time of a head subword of the reconstructed key word with a high score, control section 202 retrieves a corresponding video scene from storage section 201. Video signals composing the retrieved video scene output from storage section 201 are output outside from video signal output section 206, and voice signals accompanying the video signals are output outside from voice signal output section 207.

The following explains in detail about processing for generating the video retrieval index in retrieval data generation section 100. Voice characteristic pattern extraction section 103 divides an input voice signal into analysis frames of 10 msec sequentially, and performs Fast Fourier transform on each analysis frame to convert into acoustic property data representative of acoustic properties at a human voice frequency band. Further the section 103 converts the acoustic property data of the voice frequency band into vector data with N (N is an arbitrary natural number) components comprised of acoustic characteristic amounts. This vector data is used as a voice characteristic pattern. As the acoustic characteristic amount, it is preferable to use short-time spectra or logarithmic value of the spectra at the voice frequency band of an input voice, or logarithmic energy of the input voice at a predetermined interval.

Thus, the input voice is converted into the voice characteristic pattern (vector data) for every 10 msec, and the converted voice characteristic pattern is sequentially output to video retrieval index generation section 104. In addition a frame length of the analysis frame is not limited to 10 msec.

Standard voice characteristic pattern storage section 105 stores subwords (#V, #CV, #CjV, CV, CjV, VC, QC, VQ, VV, and V#, where C is a consonant, V is a vowel, j is, Q is a double consonant, and # is silent) in advance as standard voice patterns. Voices collected from a plurality of speakers are analyzed in advance to extract voice characteristic patterns per subword basis. The extracted voice characteristic patterns are subjected to statistical processing, and then registered as the standard voice patterns. Specifically, standard voice characteristic pattern storage section 105 stores a table relating each subword to a standard voice pattern thereof (extracted voice characteristic pattern). FIG. 3 illustrates specific examples of the standard voice patterns. About 500 standard voice patterns are prepared in this figure. However the number of standard voice patterns to be stored in standard voice characteristic pattern storage section 105 is not limited to 500, and may be determined as appropriate in a relationship between a computation amount and retrieval accuracy.

Video retrieval index generation section 104 fetches a first standard voice pattern from standard voice characteristic pattern storage section 105, and obtains a similarity between the first standard voice pattern and a voice characteristic pattern of an input voice using voice recognition processing. As the voice recognition processing, it is preferable to use voice recognition methods such as DP collation method and HMM. The section 104 detects as a subword interval an interval indicative of the highest similarity with respect to the first standard voice pattern, and obtains a beginning time, ending time and a score, which is the similarity, of the detected subword interval. With respect to the thus detected subword interval corresponding to the first standard voice pattern, the group of the beginning time, ending time and score is output as a single video retrieval index. In other words, the single video retrieval index is comprised of a phoneme sign, beginning time, ending time and score.

After obtaining the video retrieval index corresponding to the first standard voice pattern, a second standard voice pattern is fetched from standard voice characteristic pattern storage section 105. Then the section 104 compares the voice characteristic pattern of the same voice interval as described above with the second standard voice pattern, detects a subword interval with respect to the second standard voice pattern in the same way as described above, and outputs the group of beginning time, ending time and score of the detected subword interval as the video retrieval index. Thereafter, in the same way as described above, the section 104 detects respective similarities between the voice characteristic pattern of the same voice interval and each of the other left standard voice patterns while switching between the standard voice patterns, and generates video retrieval indexes each comprised of the group of the beginning time, ending time and score on all the standard voice patterns.

After generating the video retrieval indexes of all the standard voice patterns in a voice interval of the input voice, video retrieval index generation section 104 shifts a voice interval to be processed to a next voice interval neighboring to the processed interval to execute the same processing. Thereafter in the same way as described above, the section 104 generates retrieval indexes over all the intervals of the input voice to complete the processing, while shifting the voice interval to be processed.

The following explains in detail about processing for retrieving a video scene using a key word in retrieval processing section 200.

Figure 4:
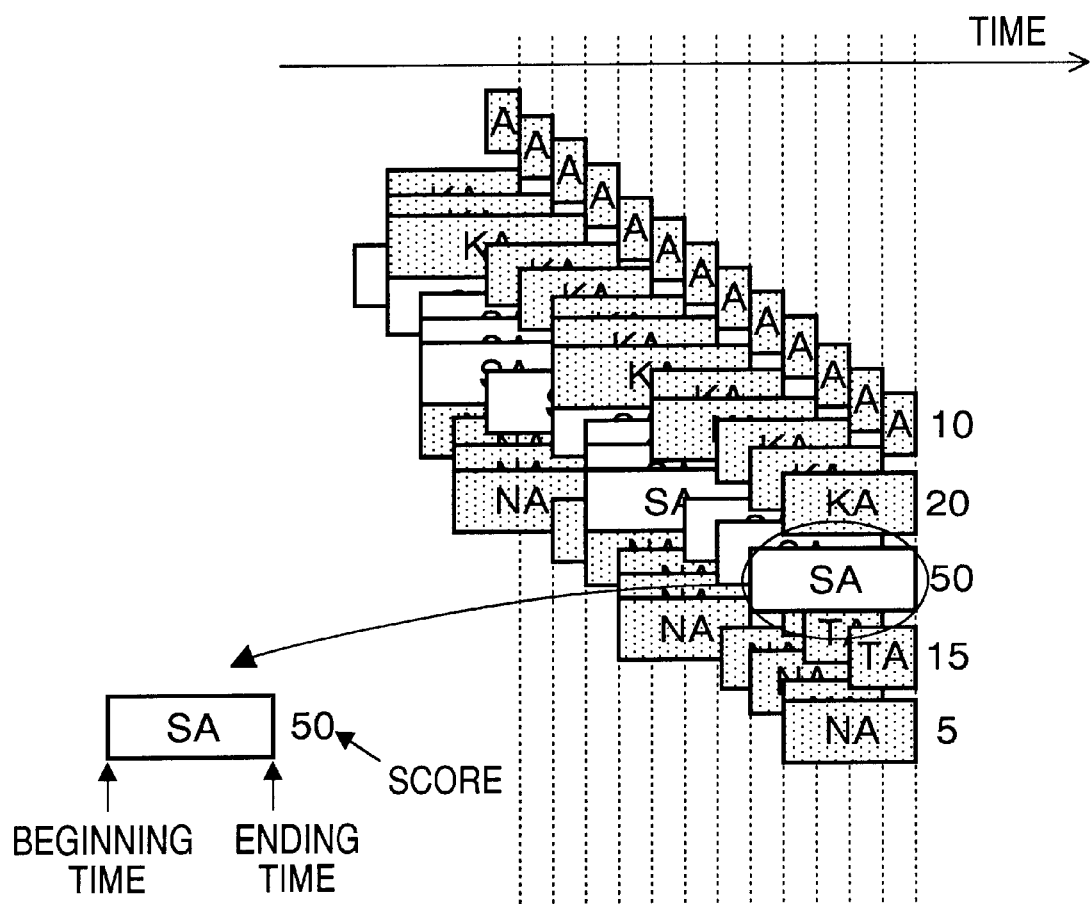
FIG. 4 is a diagram illustrating a phoneme similarity table.

FIG. 4 illustrates part of a lattice structure of video retrieval indexes. An end of each voice interval of 10 msec divided from the input voice is set to be an end of each of the video retrieval indexes generated in the voice interval, and the video retrieval indexes in the same voice interval are arranged in the order of generation, whereby the video retrieval indexes are arranged in the form of lattices over an entire input voice. Thus obtained lattice structure of the voice retrieval indexes is referred to as a phoneme similarity table. In the phoneme similarity table, each video retrieval index is representative of the group of the score and a length corresponding to the beginning time thereof. FIG. 4 illustrates five kinds of subwords of "A", "KA", "SA", "TA" and "NA" as representative examples among the phoneme similarity table of video retrieval indexes.

It is assumed that key word input section 203 receives "SORA" as a retrieval key word. Key word conversion section 204 converts "SORA" of the retrieval key word into a sequence of subwords. "SORA" is converted into "SO, OR, and RA".

Figure 5:
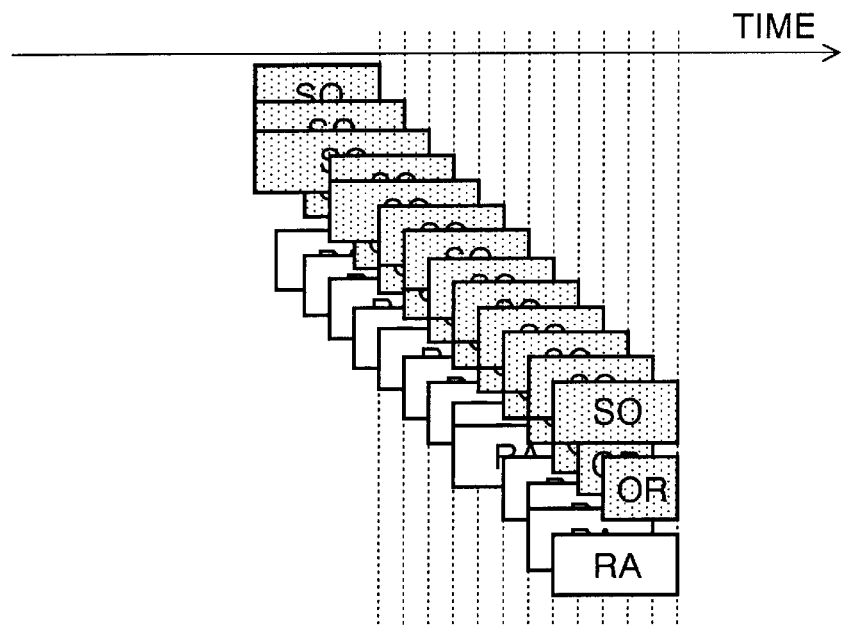
FIG. 5 is a diagram illustrating a situation in which subwords corresponding to a phoneme sequence of a key word are picked up from the phoneme similarity table.

Key word pattern collation section 205 picks up subwords composing the retrieval key word from among the phoneme similarity table. In other words, the section 205 only picks up subwords "SO", "OR", and "RA" composing the retrieval key word among lattices at each time. FIG. 5 illustrates picked up lattices each comprised of one of subwords "SO", "OR", and "RA" of the retrieval key word.

Key word pattern collation section 205 connects subwords "SO", "OR" and "RA" on a plurality of picked up lattices in the order of the sequence of subwords converted from the retrieval key word with no space inserted between the subwords. The section 205 fetches a final subword "RA" of a lattice ending at a time, fetches a subword "OR", before the final one, on another lattice ending at the beginning time of "RA", further fetches a subword "SO", before the "OR", on the other lattice ending at the beginning time of "OR", and connects "SO", "OR" and "RA" using the end of final subword "RA" as a reference.

Figure 6:
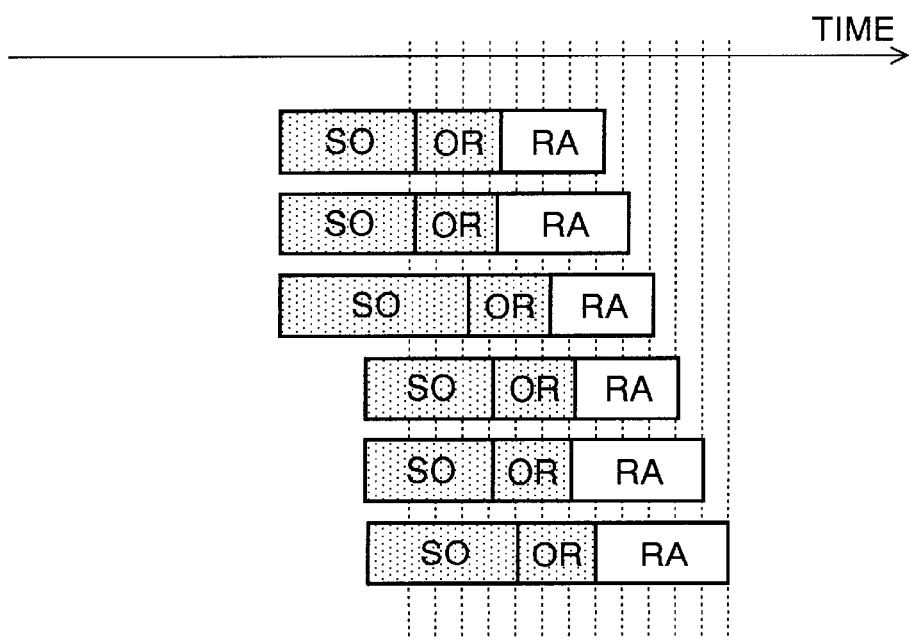
FIG. 6 is a diagram illustrating a situation in which picked-up subwords are arranged in the order of the phoneme sequence of the key word.

With respect to a key word thus reconstructed by connecting "SO", "OR" and "RA", key word pattern collation section 205 calculates a score of the reconstructed key word. Specifically the section 205 adds scores assigned for subwords "SO", "OR" and "RA" composing the reconstructed key word. This addition value is the score of the reconstructed key word. Thereafter in the same way as described above, the section 205 generates reconstructed key words sequentially at all the times, while shifting the ending time of the subword "RA", and calculates the score of each reconstructed key word. FIG. 6 illustrates reconstructed key words obtained by shifting the ending time of the subword "RA".

Key word pattern collation section 205 processes compression/decompression processing on each constructed key word (sequence of the subword) using, for example, DP collation method, in consideration of expansion and contraction characteristics of a voice. Then the section 205 calculates scores of all the reconstructed key words, and outputs these scores of the reconstructed key words to control section 202.

Control section 202 calculates a timecode of a video signal corresponding to the beginning time of a head subword of the reconstructed key word with a high score, and performs control to reproduce corresponding parts of the video and voice signals stored in storage section 201. As a result, reproduced video and voice signals are respectively output from video signal output section 206 and voice signal output section 207.

Thus sequence of a subword assigned a score is generated from a voice signal accompanying a video signal to be retrieved, and the data is stored as a video retrieval index in storage section 201, while in retrieving, a key word is converted into subwords to collate with video retrieval indexes. Therefore it is possible to cancel a storage section with a word dictionary and/or retrieval key words registered in advance, and there is another advantage that the out-of-vocabulary word problem is not generated.

Further since the collation with the key words registered in advance is not performed, it is possible to retrieve the most reliable video scene even in the case where a user inputs an uncertain key word, and thus to provide an excellent effect.

Second Embodiment

A scene retrieval system according to the second embodiment of the present invention transmits a video retrieval index generated in a retrieval data generation apparatus to a retrieval apparatus via a transmission medium.

Figure 7:
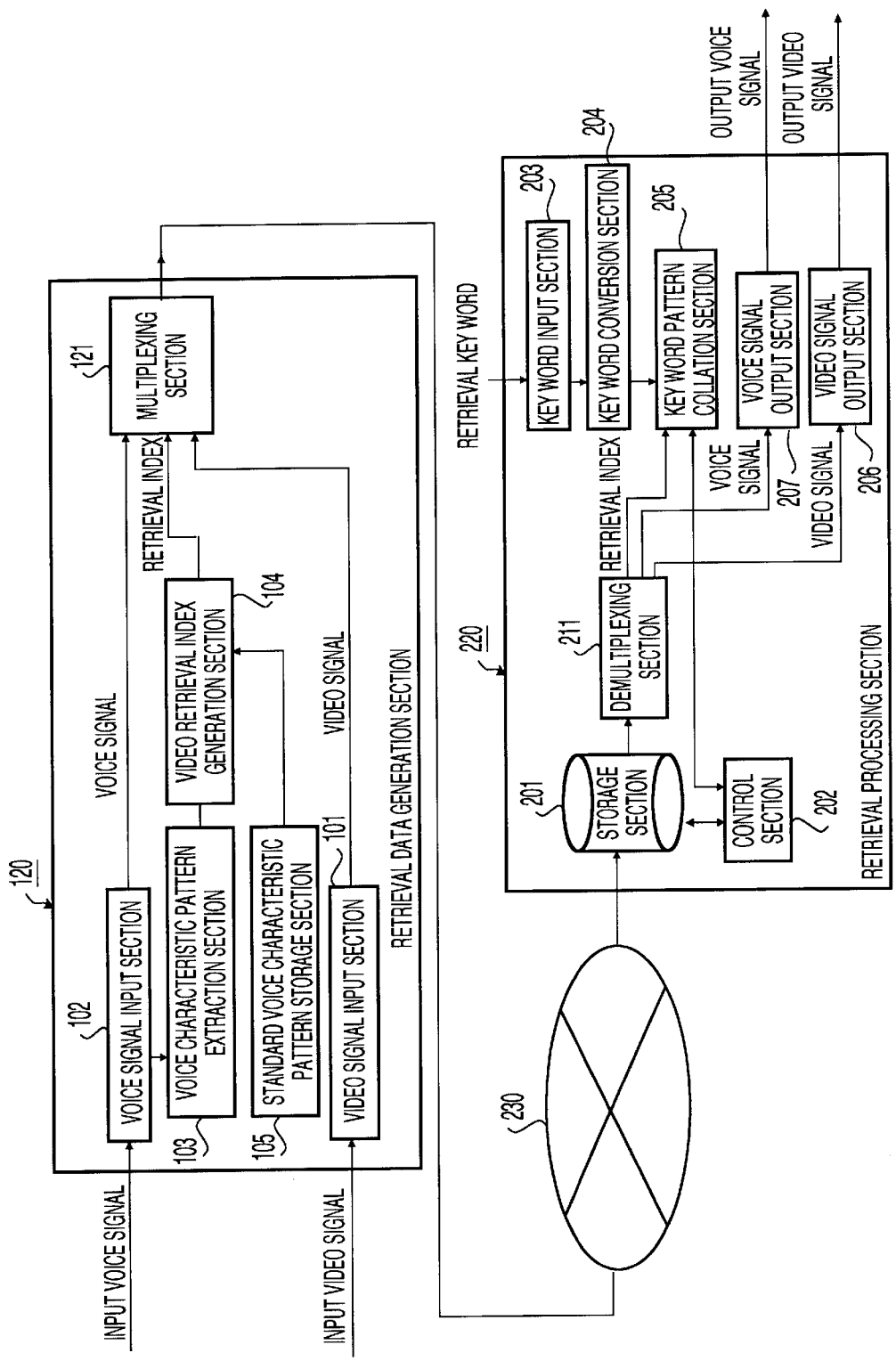
FIG. 7 is a functional block diagram of a scene retrieval system according to a second embodiment of the present invention.

FIG. 7 illustrates a configuration of the scene retrieval system according to the second embodiment. In the figure, the same marks are used for sections with the same functions as the first embodiment as described above. The scene retrieval system is comprised of retrieval data generation apparatus 120 that multiplexes video retrieval indexes generated from a voice signal accompanying a video signal in a data stream, retrieval apparatus 200 that collates a subword of a retrieval key word with the video retrieval indexes to retrieve a desired video scene, and transmission medium 230 for use in transmitting the data stream with the video retrieval indexes multiplexed in retrieval data generation apparatus 120 to retrieval apparatus 220. Transmission medium 230 includes, for example, broadcast networks, communication networks and recording media. The broadcast networks include terrestrial broadcast networks and cable broadcast networks, and the communication networks include the internet. The broadcast networks further include radio broadcast networks in retrieving a voice scene.

Retrieval data generation apparatus 120 is provided with video signal input section 101, voice signal input section 102, voice characteristic pattern extraction section 103, video retrieval index generation section 104, and standard voice pattern storage section 105. Retrieval data generation apparatus 120 further has multiplexing section 121 that multiplexes video retrieval indexes generated in video retrieval index generation section 104, video signals and voice signals. While it is preferable for multiplexing section 121 to multiplex the video retrieval indexes, video signals and voice signals in an MPEG stream, it may be possible to multiplex in other data streams.

Retrieval apparatus 220 is provided with storage section 201, control section 202, key word input section 203, key word conversion section 204, key word pattern collation section 205, video signal output section 206, and voice signal output section 207. Retrieval apparatus 200 further has demultiplexing section 221 that demultiplexes the video retrieval indexes, video signals and voice signals from the data stream in which the video retrieval indexes, video signals and voice signals are multiplexed.

Video retrieval index generation section 104 provided in retrieval data generation apparatus 120 generates the video retrieval indexes from an input signal in the same way as in the first embodiment as described above. The generated video retrieval indexes are output to multiplexing section 121. In addition, the video signal received in video signal input section 101 and the voice signal received in voice signal input section 102 are output to multiplexing section 121.

Multiplexing section 121 converts the video signals, voice signals, and video retrieval indexes respectively into a plurality of video streams (video stream (1) to video stream (n)), voice streams (voice stream (1) to voice stream (n)), and private streams to store user data (these streams are used in transmitting video retrieval indexes, and referred to as retrieval data streams: retrieval data stream (1) to retrieval data stream (n)).

Figure 8:
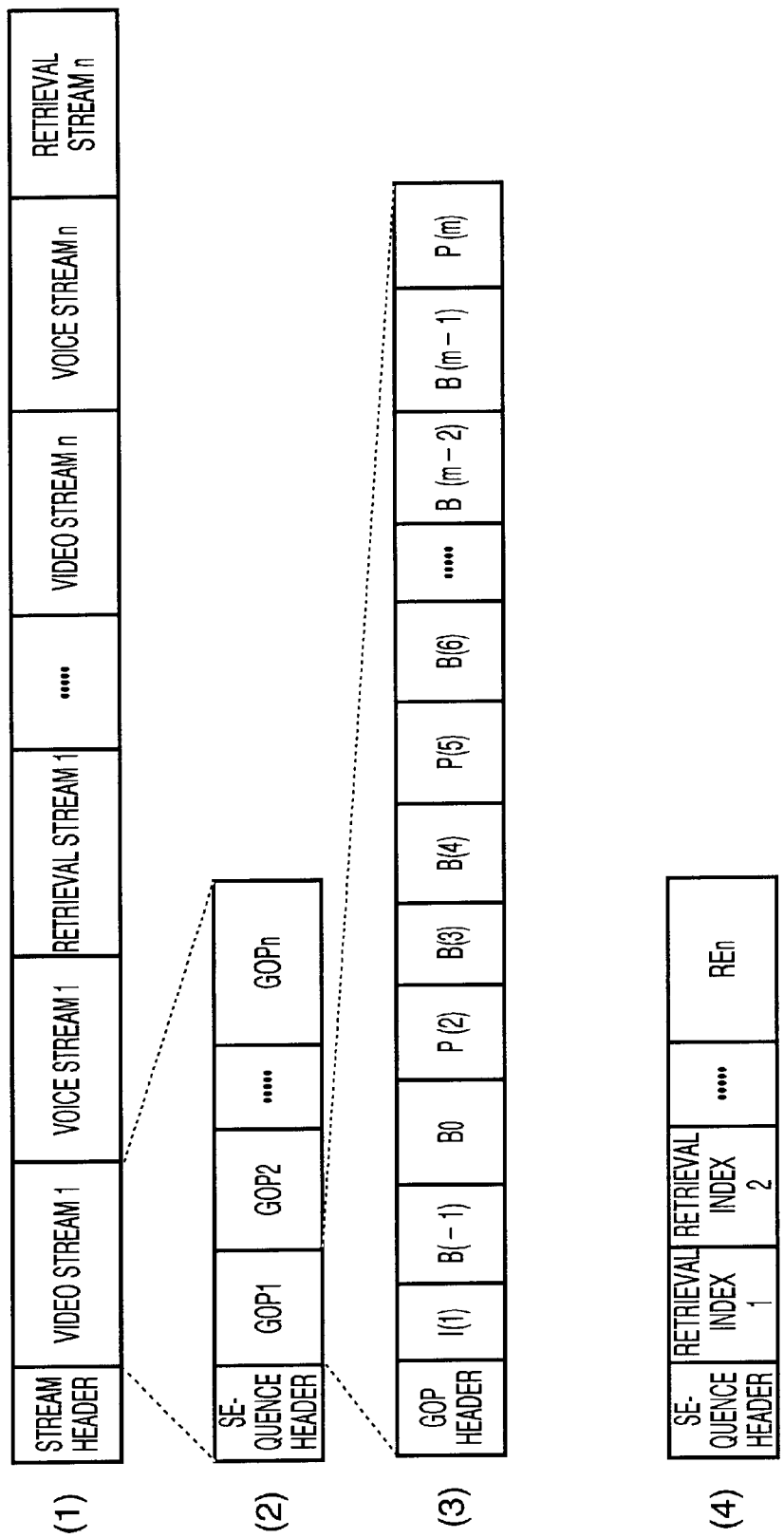
FIG. 8(1) is a structure diagram of an MPEG stream in which video signals, voice signals and video retrieval indexes are multiplexed.

FIG. 8(1) illustrates a frame structure of the MPEG stream in which the video retrieval indexes, video signals and voice signals are multiplexed. Stream head 101 is to added to a head of the MPEG stream to identify the stream. FIG. 8(2) illustrates a structure of the video stream. The video stream is comprised of a plurality of GOP (Group of Videos: GOP(1) to GOP(n)). FIG. 8(3) illustrates a structure of the GOP. The GOP is comprised of a series of groups of an intra-frame coded I video (I(1)), P videos (P(2) to P(m)) coded by motion compensation prediction with reference to the I video or P video, an I video positioned timewise before and after, and B videos (B-1) to B(m-1)) coded by the motion compensation prediction from both videos with reference to P videos. FIG. 8(4) illustrates a structure of the data retrieval stream. The video retrieval indexes (video retrieval index (1) to video retrieval index (n)) are arranged as units corresponding to a series of video frames.

The MPEG stream multiplexed in multiplexing section 121 is transmitted to retrieval apparatus 220 through transmission media 230 to be stored in storage section 201. In retrieval apparatus 220, demultiplexing section 221 demultiplexes the retrieval indexes from the multiplexed MPEG stream to provide to key word pattern collation section 205. A key word is collated with the video retrieval indexes, and reconstructed key words are generated in the same way as the first embodiment. Control section 202 accesses to the GOP corresponding to a beginning time of the reconstructed key word with a high score to retrieve a video scene. In addition it may be possible to demultiplex the video signals and voice signals along with the video retrieval indexes when the indexes are demultiplexed from the MPEG stream, to store in storage section 201.

Thus, since the video retrieval indexes per subword basis of the input voice are multiplexed in the data stream along with the video signals and voice signals, it is possible to provide the video retrieval indexes to a user along with videos using the broadcast networks and communication networks.

In addition the GOP is unit video reproduction in the MPEG. Therefore when the unit retrieval index is brought into coincidence with the GOP, it is possible to start reproducing a desired video scene with ease by accessing to the GOP corresponding to the retrieval index corresponding to an input key word at the time of retrieval processing.

Third Embodiment

The third embodiment describes a scene retrieval system in which when a retrieval key word is input from a user terminal, a server system connected to the user terminal through communication networks provides a corresponding scene.

Figure 9:
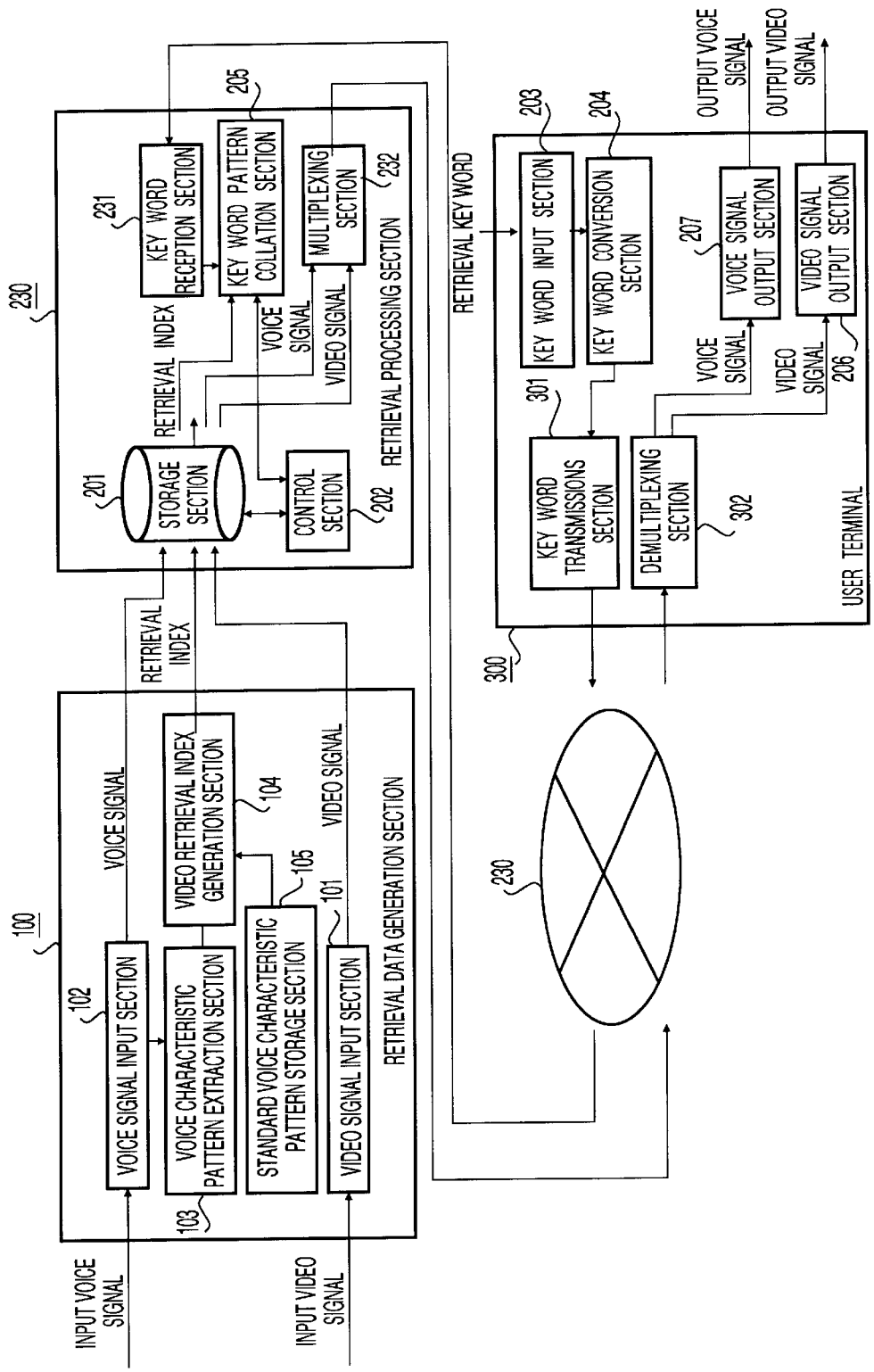
FIG. 9 is a functional block diagram of a scene retrieval system according to a third embodiment of the present invention.

FIG. 9 illustrates a system configuration of the scene retrieval system according to the third embodiment. In FIG. 9, the same marks are used for sections with the same functions as the first embodiment and second embodiment as described above. The server system is comprised of retrieval data generation section 100 and retrieval processing section 230, and retrieves a video scene that a user desires to transmit to the user terminal.

Retrieval data generation section 100 is comprised of video signal input section 101, voice signal input section 102, voice characteristic pattern extraction section 103 and video retrieval index generation section 104.

Retrieval processing section 230 is provided with storage section 201, control section 202, and key word pattern collation section 205. Further retrieval processing section 230 has key word reception section 231 that receives data of a retrieval key word transmitted from user terminal 300 through transmission medium 230, and multiplexing section 232 that multiplexes a video signal and voice signal of a retrieved scene in a data stream to transmit to user terminal 300 through transmission medium 230.

User terminal 300 is provided with key word input section 203, key word conversion section 204, video signal output section 207 that outputs the video signal of the retrieved scene, and voice signal output section 206 that outputs the voice signal of the retrieved scene. User terminal 300 further has key word transmission section 301 that transmits subwords of the retrieval key word converted in key word conversion section 204 to retrieval processing section 230 through transmission medium 230, and demultiplexing section 302 that demultiplexes the video signal and voice signal from the data streams received from retrieval processing section 203 through transmission medium 230.

In the scene retrieval system configured as described above, user terminal 300 inputs the retrieval key word. In user terminal 300, key word conversion section 204 converts the input key word into subwords of the input key word. Then key word transmission section 301 transmits the subwords of the input key word through transmission medium 230. Communication networks such as the internet are preferable as transmission medium 230 in this embodiment.

Storage section 201 in retrieval processing section 230 stores, in the same way as the first embodiment as described previously, video signals, voice signals and video retrieval indexes with a lattice structure. Key word reception section 231 provides received key word data to key word pattern collation section 205. Key word pattern collation section 205 picks up, as described as previously, video retrieval indexes each with a phoneme sign matching one of the subwords of the key word among the lattice structure of the video retrieval indexes, and generates a reconstructed key word at each time. Then control section 202 retrieves corresponding video signals and voice signals based on a beginning time of the reconstructed key word with a high score. The video signals and voice signals of the thus retrieved scene are multiplexed in the data stream in multiplexing section 232, and transmitted to user terminal 300 through transmission medium 230.

In user terminal 300, demultiplexing section 302 demultiplexes the video signals and voice signals from the data stream transmitted corresponding to the retrieval key word. The demultiplexed video signals and voice signals are respectively output from video signal output section 206 and voice signal output section 207.

Thus connecting user terminal 300 and the server system (retrieval data generation section 100 and retrieval processing section 230) through communication network 230 enables user terminal 300 that does not have functions for generating and retrieving the video retrieval indexes to retrieve a desired scene.

In addition, while in the aforementioned third embodiment, user terminal 300 is provided with key word conversion section 204, it may be possible to provide retrieval processing section 230 with key word conversion section 204. According this configuration, it is possible to perform the above-mentioned retrieval without installing new software in a current user terminal.

Fourth Embodiment

The fourth embodiment describes an example that the scene retrieval system of the present invention is applied to a video recording apparatus. The video recording apparatus according to this embodiment detects a human voice from voice signals obtained in video recording, and extracts acoustic property data obtained from the voice as voice characteristic pattern data. Further the apparatus forms the voice characteristic pattern data into a time information added index structure to record in a recording medium along with a video signal and voice signal.

Figure 10:
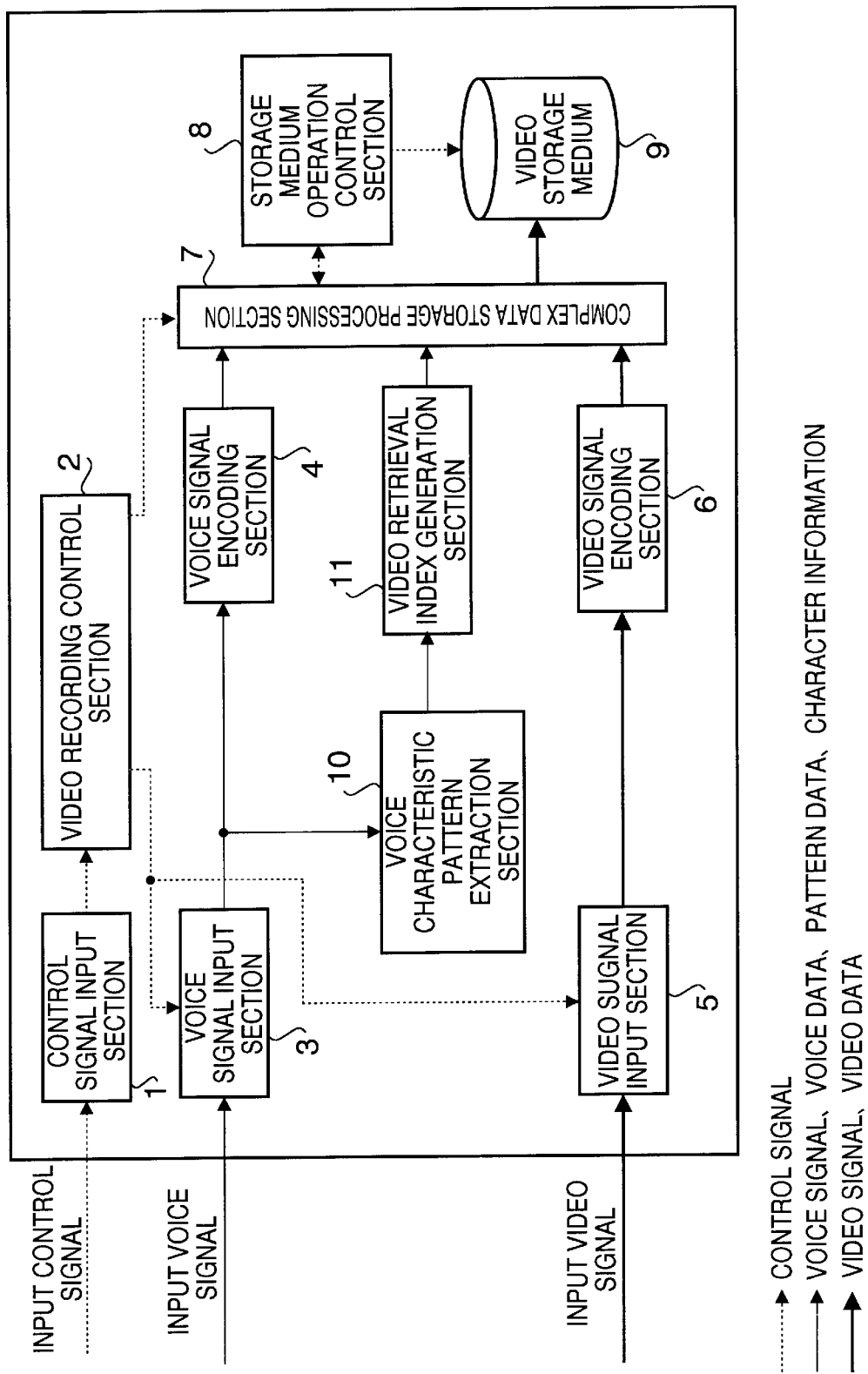
FIG. 10 is a functional block diagram of a video recording apparatus according to a fourth embodiment of the present invention.

FIG. 10 illustrates a configuration of the video recording apparatus according to this embodiment. Control signal input section 1 receives signals such as a video recording instruction control signal input from an external. Video recording control section 2 issues a recording start instruction signal and halt instruction signal to each block composing the apparatus corresponding to types of received control signals.

Meanwhile, voice signal input section 3 converts analog voice signals input after the video recording is started into digital voice signals, and voice signal encoding section 4 performs compression processing such as the MPEG on the digital voice signals. Video signal input section 5 converts analog video signals input after the video recording is started into digital video signals, and video signal encoding section 6 performs compression processing such as the MPEG on the digital video signals.

Voice signal input section 3 inputs the digital voice signals to voice characteristic pattern extraction section 10. Voice characteristic pattern extraction section 10 detects the acoustic property data of the human voice from the input digital voice signals to acquire the voice characteristic pattern data. Video retrieval index generation section 11 makes the voice characteristic pattern data provided from voice characteristic pattern extraction section 10 into packets at time intervals synchronous with video signals to form into the video retrieval index structure with the time information added thereto.

Complex data storage processing section 7, instructed from video recording control section 2, multiplexes the compressed video signals and voice signals, and the video retrieval indexes to store in video storage medium 9 such as DVD in recording format. Video storage medium 9 is comprised of, for example, an optical disk, HDD (magnetic disk), memory card or magnetic tape. Storage medium operation control section 8 performs physical control such as a seek to a recording position in video storage medium 9, by a control instruction from complex data storage processing section 7. The video recording apparatus configured as described above may be comprised of, for example, a microcomputer incorporated device or dedicated LST circuits. In this video recording apparatus, a voice characteristic pattern extraction step is comprised of voice characteristic pattern extraction section 10, and an index information storage step is comprised of video retrieval index generation section 11 and complex data storage processing section 7.

The following explains about the operation of this apparatus.

When control signal input section 1 receives a control signal instructing video recording from an external input device such a remote control device or keyboard, the section 1 converts the control signal into a signal of format adapted to the apparatus, and issues the video recording instruction signal to video recording control section 2. Video recording control section 2 receives the video recording instruction signal, and instructs each section composing the apparatus to start video recording to shift an apparatus state to a video recording state.

Voice signal input section 3 receives the instruction for starting the video recording, performs A/D conversion on voice signals input from an external device such as a television signal tuning device, microphone, or VTR to quantize, and provides the voice signals to voice signal encoding section 4 and voice characteristic pattern extraction section 10 sequentially. Voice signal encoding section 4 performs voice signal band compression processing such as the MPEG on the provided voice signals to output to complex data storage processing section 7 sequentially.

Voice characteristic pattern extraction section 10 receives the voice signals provided from voice signal input section 3, performs FFT (Fast Fourier Transform) on the voice signals per unit time, extracts the acoustic property data at a human voice frequency band, and generates the voice characteristic pattern data that is vector data with N (N is an arbitrary natural number) components comprised of acoustic characteristic amounts generally used in voice recognition processing, such as short-term spectral data or logarithmic value of spectra at the extracted frequency band, and logarithmic energy of the voice signals per unit time.

Voice characteristic pattern extraction section 10 sequentially outputs the extracted and generated voice characteristic pattern data to video retrieval index generation section 11. Video retrieval index generation section 11 collects items of the voice characteristic pattern data, input sequentially, per unit time enabling synchronization between the video signals and voice signals with the time series maintained, to make into packets, and adds time information and an identification indicative of the voice characteristic pattern data to each packet. Thereby an index structure is generated that enables access to the video signals or voice signals by referring to the time information using a position of the voice characteristic pattern data. The section 11 outputs the generated index structure packets to complex data storage processing section 7 sequentially.

Meanwhile video signal input section 5 also receives the instruction for starting the video recording, performs A/D conversion on video signals input from an external device such as the television signal tuning device, camera, or VTR to quantize, and provides the video signals as predetermined video signals to video signal encoding section 6. Video signal encoding section 6 performs video signal band compression processing such as the MPEG on the provided digital video signals to output to complex data storage processing section 7 sequentially.

Complex data storage processing section 7 receives the instruction for starting the video recording, issues the control signal to storage medium operation control section 8 before starting recording data, and holds a data recording starting position in storage medium 9. Complex data storage processing section 7 receives the video signals and voice signals each applied the signal band compression processing, and the index structure packets generated in video retrieval index generation section 11, multiplexes the video signals, voice signals and index structure packets in predetermined format such as the MPEG, issues the control signal to recording storage operation control section 8, and records the multiplexed data at a predetermined position on video storage medium 9 according to the recording format such as the DVD.

The sequence of operations as described above is iterated during the time from video recording is started to video recording control section 2 detects elapse of video recording time, finish of video signal input from the external, video recording halt instruction by the control signal from the external, or an error notification from a section inside the apparatus. When video recording control section 2 detects either of the above-mentioned conditions, the section 2 instructs each section composing the apparatus to halt the video recording, shits the apparatus state to the initial state, and thereby finishes the operation.

While the above-mentioned index structure packets are comprised of time series of the voice characteristic pattern data, it may be possible that video retrieval index generation section 11 performs phoneme recognition processing on the time series of the voice characteristic pattern data to convert the index structure packets into the time series of a phoneme similarity table that is a result of time series pattern collation for each subword.

In other words, video retrieval index generation section 11 calculates a similarity between the time series of the voice characteristic pattern data sequentially input from voice characteristic pattern extraction section 10, and standard patterns per subword basis stored in advance in video retrieval index generation section 11, to generate the phoneme similarity table.

Herein, the standard voice patterns per subword basis are phoneme time series such as short-term spectral data in the same way as the voice characteristic pattern. A collation interval is fixed to a predetermined time also with respect to input voice characteristic pattern data, and the section 11 performs time series pattern collation on the phoneme time series of the standard voice pattern and that of the voice characteristic pattern data using, for example, DP (Dynamic Programming) collation method.

In the time series pattern collation, the collation interval is obtained in the time series of the voice characteristic pattern data that is the most similar to the standard voice pattern per subword basis, and the collation results are summarized as the phoneme similarity table. In addition, the phoneme similarity table is comprised of columns of an identification (phoneme sign) of each subword, a voice interval (beginning time and ending time) that is the collation interval that is the most similar to a corresponding subword, and the similarity, and of rows corresponding to the number of subwords stored as standard voice patterns.

The section 11 fetches M (M is an arbitrary natural number) items in descending of similarity from the generated phoneme similarity table to reconstruct the similarity table, and collects the similarity tables per unit time enabling synchronization between the video signals and voice signals with the time series maintained to make into packets. The section further adds time information and an identification indicative of the phoneme similarity table data to each packet, thereby generates an index structure packet enabling access to the video signals and voice signals by referring to the time information using a position of phoneme similarity table data, and outputs the generated packet to complex data storage processing section 7 sequentially.

The thus generated index structure packet comprised of the time series of phoneme similarity table data is stored in video storage medium 9 as a video retrieval index in recording format through complex date storage processing section 7.

Thus, the retrieval indexes comprised of the time series of the phoneme similarity table are generated from voice signals in video recording, and the complex data storage processing section 7 multiplexes the indexes, video signals, and voice signals to store in video storage medium 9. Therefore it is possible to access to a desired video signal and voice signal with ease using the video retrieval index later. The retrieval indexes generated in this embodiment have the same structure as the video retrieval indexes in the first embodiment, and therefore it may be possible to perform key word retrieval in the same way as in the first embodiment.

Fifth Embodiment

A video recording apparatus according to the fifth embodiment extracts visual characteristic pattern data from video signals indicative of human vocalizing, and stores the visual characteristic pattern data as the video retrieval index.

Figure 11:
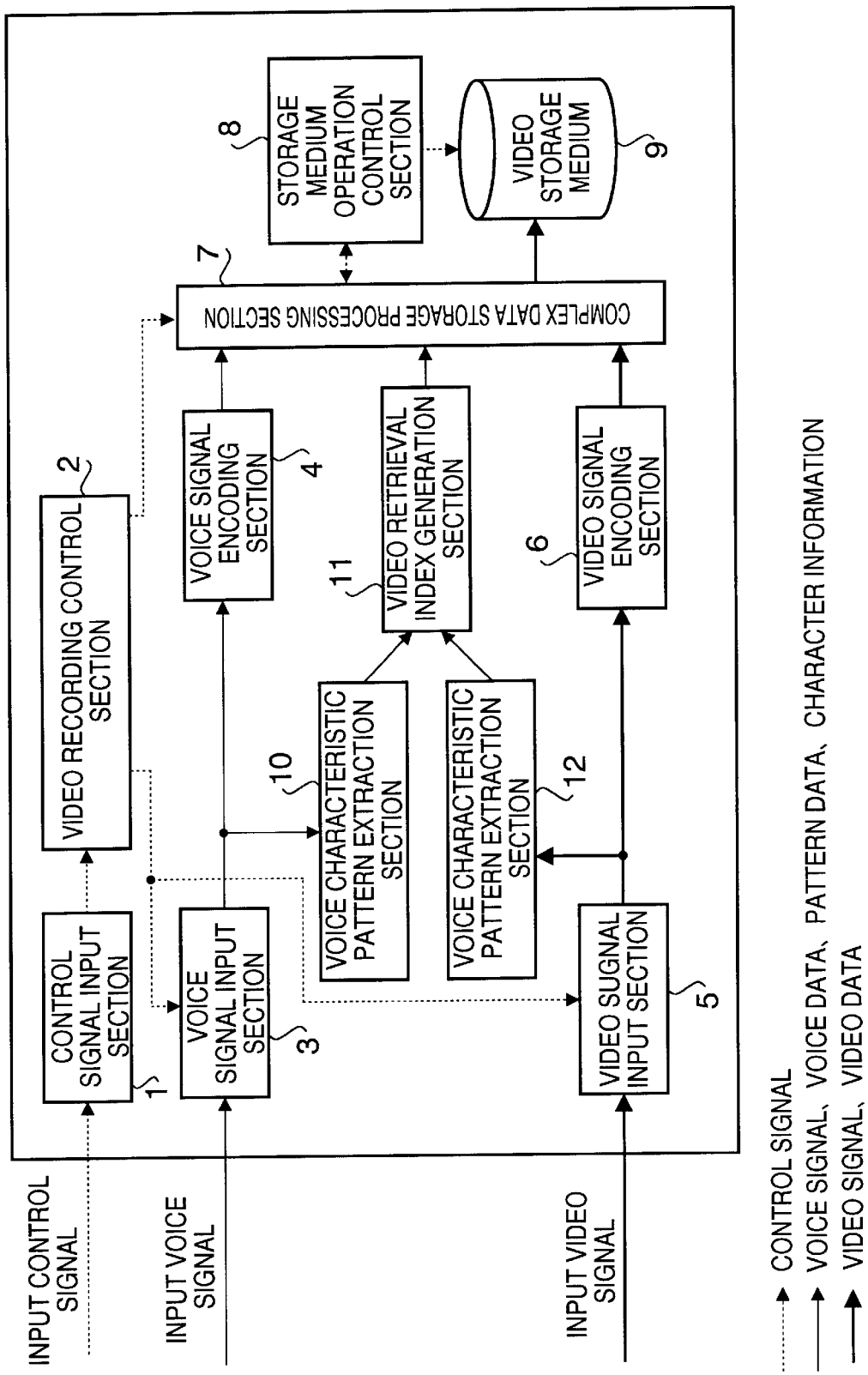
FIG. 11 is a functional block diagram of a video recording apparatus according to a fifth embodiment of the present invention.

FIG. 11 illustrates a configuration of the video recording apparatus according to this embodiment. Control signal input section 1 receives signals such as video recording instruction control signal input from an external. Video recording control section 2 issues recording start instruction signal and halt instruction signal to each block composing the apparatus corresponding to types of received control signals.

Meanwhile, voice signal input section 3 converts analog voice signals input after the video recording is started into digital voice signals, and voice signal encoding section 4 performs compression processing such as the MPEG on the digital voice signals. Video signal input section 5 converts analog video signals input after the video recording is started into digital video signals, and video signal encoding section 6 performs compression processing such as the MPEG on the digital video signals.

Voice signal input section 3 inputs the digital voice signals to voice characteristic pattern extraction section 10. Voice characteristic pattern extraction section 10 detects acoustic property data of a human voice from the input digital voice signals to acquire voice characteristic pattern data. Further video signal input section 5 provides the digital voice signals to visual characteristic pattern extraction section 12. Visual characteristic pattern extraction section 12 detects an image of a human lip area from input video signals to extract visual characteristic pattern data. Video retrieval index generation section 11 makes each of the voice characteristic pattern data provided from voice characteristic pattern extraction section 10 and the visual characteristic pattern data provided from visual characteristic pattern extraction section 12 into packets at time intervals synchronized with video signals, to form into the video retrieval index structure with time information and pattern data identification added thereto.

Complex data storage processing section 7, instructed from video recording control section 2, multiplexes the compressed video signals and voice signals, and the video retrieval indexes to store in video storage medium 9 such as a DVD in recording format. Video storage medium 9 is comprised of, for example, an optical disk, HDD (magnetic disk), memory card or magnetic tape. Storage medium operation control section 8 performs physical control such as a seek to a recording position in video storage medium 9, by a control instruction from complex data storage processing section 7. The video recording apparatus configured as described above may be comprised of, for example, a microcomputer incorporated device or dedicated LST circuits.

The following explains about the operation of this apparatus.

When control signal input section 1 receives a control signal instructing video recording from an external input device such as a remote control device or keyboard, the section 1 converts the control signal into a signal of format adapted to the apparatus, and issues the video recording instruction signal to video recording control section 2. Video recording control section 2 receives the video recording instruction signal, and instructs each section composing the apparatus to start video recording to shift an apparatus state to a video recording state.

Voice signal input section 3 receives the instruction for starting the video recording, performs A/D conversion on voice signals input from an external device such as a television signal tuning device, microphone, or VTR to quantize, and provides the voice signals to voice signal encoding section 4 and voice characteristic pattern extraction section 10 sequentially. Voice signal encoding section 4 performs voice signal band compression processing such as the MPEG on the provided voice signals to output to complex data storage processing section 7 sequentially.

Voice characteristic pattern extraction section 10 receives the voice signals provided from voice signal input section 3, performs FFT (Fast Fourier Transform) on the voice signals per unit time, extracts the acoustic property data at a human voice frequency band, and generates vector data with N (N is an arbitrary natural number) components comprised of acoustic characteristic amounts generally used in voice recognition processing, such as short-term spectral data or logarithmic value of spectra at the extracted frequency band, and logarithmic energy of the voice signals per unit time, which is used voice characteristic pattern data in the present invention.

Voice characteristic pattern extraction section 10 sequentially outputs the extracted voice characteristic pattern data to video retrieval index generation section 11. Video retrieval index generation section 11 collects items of the voice characteristic pattern data, input sequentially, per unit time enabling synchronization between the video signals and voice signals with the time series maintained, to make into packets, and adds time information to each packet. Thereby the section 11 generates an index structure that enables access to the video signals or voice signals by referring to the time information using a position of the voice characteristic pattern data, and outputs the generated index structure packets to complex data storage processing section 7 sequentially.

Meanwhile video signal input section 5 also receives the instruction for starting the video recording, performs A/D conversion on video signals input from an external device such as the television signal tuning device, camera, or VTR to quantize, and provides the video signals as predetermined video signals to video signal encoding section 6 and visual characteristic pattern extraction section 12. Video signal encoding section 6 performs video signal band compression processing such as the MPEG on the provided digital video signals to output to complex data storage processing section 7 sequentially.

Visual characteristic pattern extraction section 12 receives the video signals from video signal input section 5, detects a portion of a human lip area, and extracts a lip area image for each image frame of the input video signals, using lip characteristic standard patterns fetched from lip area images of some person internally registered in advance in visual characteristic pattern extraction section 12. To detect the lip area and extract the lip area image, used as an image characteristic pattern is color distribution histogram in color space in the lip area, and used as color distribution in image space is color information such as color mean data and luminance mean data in each block obtained by dividing the lip area image into n.times.m image blocks (each of n and m is an arbitrary natural number, n is the number of division on X axis, and m is the number of division on Y axis). Further considering that a size of a lip area varies in an input image frame, a size of the lip area image is made variable to detect the lip area and extract the lip area image.

When visual characteristic pattern extraction section 12 detects and extracts the lip area from the input image frame, the section 12 further extracts the visual characteristic pattern data at the time of human vocalizing from the extracted lip area image.

Used as the visual characteristic pattern is information representative of a form of a lip. One example is vector data with components corresponding to the number of divided image blocks, where each component is comprised of color mean data or luminance mean data of each image block, used in extracting the lip area image, obtained by dividing a lip area image space into an arbitrary number of blocks. Another example is vector data with 4 numerical components obtained by further extracting only a lip portion from the lip area image data extracted as the visual characteristic, using, for example, a color filter, and calculating a respective relative distance of two points each circumscribing a lip outer boundary in a vertical direction (upper and lower) and of two points each circumscribing the lip outer boundary in a horizontal direction, each from an area centroid point of the lip portion.

Voice characteristic pattern extraction section 10 sequentially outputs the extracted voice characteristic pattern data to video retrieval index generation section 11, and visual characteristic pattern extraction section 12 outputs the extracted visual characteristic pattern data to video retrieval index generation section 11. Video retrieval index generation section 11 collects items of each of the voice characteristic pattern data and visual characteristic pattern data, each input sequentially, per unit time enabling synchronization between the video voice signals and voice signals with the time series maintained, to make into packets for each type of characteristic pattern data, and adds time information and an identification indicative of the type of characteristic pattern data to each packet. Thereby the section 11 generates an index structure packet that enables access to the video signals and voice signals by referring to the time information using positions of the voice characteristic pattern data and visual characteristic data, and outputs the generated index structure packet to complex data storage processing section 7 sequentially.

Complex data storage processing section 7 receives the instruction for starting the video recording, issues the control signal to storage medium operation control section 8 before starting recording data, and holds a data recording starting position in storage medium 9. Complex data storage processing section 7 receives the video signals and voice signals each applied the signal band compression processing, and the index structure packets generated in video retrieval index generation section 11, multiplexes the video signals, voice signals and index structure packet data in predetermined format such as the MPEG, issues the control signal to storage medium operation control section 8, and records the multiplexed data at a predetermined position on video storage medium 9 according to the recording format such as the DVD.

The sequence of operations as described above is iterated during the time from video recording is started to video recording control section 2 detects elapse of video recording time, finish of video signal input from the external, video recording halt instruction by the control signal from the external, or an error notification from a section inside the apparatus. When video recording control section 2 detects either of the above-mentioned conditions, the section 2 instructs each section composing the apparatus to halt the video recording, shits the apparatus state to the initial state, and thereby finishes the operation.

Thus the visual characteristic pattern data at the time of human vocalizing is extracted from the video signals, and used along with the voice characteristic pattern data to generate the video retrieval indexes. Therefore it is possible to supplement voice recognition accuracy when the recognition accuracy is decreased due to BGM (Background Music) and environment noise.

Sixth Embodiment

A video reproduction apparatus according to the sixth embodiment performs video retrieval with a key word and quick reproduction, using video retrieval indexes stored in the method as described in the fourth embodiment or fifth embodiment.

Figure 12:
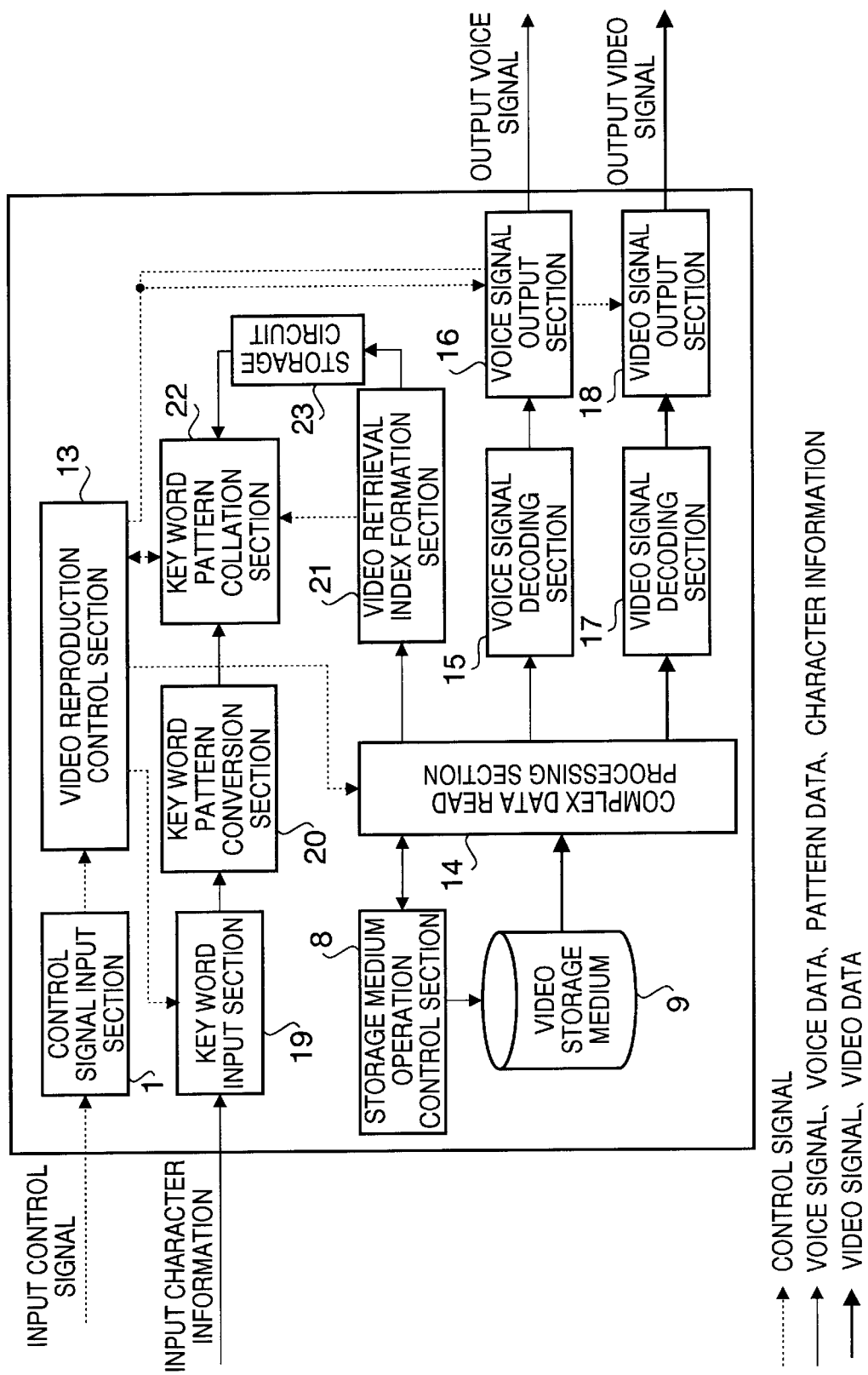
FIG. 12 is a functional block diagram of a video reproduction apparatus according to a sixth embodiment of the present invention.

FIG. 12 illustrates a configuration of the video reproduction apparatus according to the sixth embodiment. Control signal input section 1 receives signals such as video reproduction instruction control signal input from an external. Video reproduction control section 13 issues a recording start instruction signal and halt instruction signal to each block composing the apparatus corresponding to types of received control signals. Video storage medium 9 stores video signals and voice signals including video retrieval indexes generated in the method as described in the fourth or fifth embodiment in predetermined recording format such as the DVD. As video storage medium 9, it may be possible to use, for example, an optical disk, HDD (magnetic disk), memory card or magnetic tape. Complex data read processing section 7 reads the video signal and voice signal from a time position indicative of a video reproduction position according to the recording format in video storage medium 9 by an instruction from video reproduction control section 13, and further reads the video retrieval index. At this point, storage medium operation control section 8 performs physical control such as a seek to a position where data to be read is recorded, by a control instruction from complex data read processing section 7.

Voice signal decoding section 15 compresses a signal band of the voice signals subjected to signal band decompression processing such as the MPEG provided from complex data read processing section 14. Voice signal output section 16 performs D/A conversion on the voice signals subjected to the signal band compression processing to output to an external. Further video signal decoding section 17 compresses a signal band of the video signals subjected to signal band decompression processing such as the MPEG provided from complex data read processing section 14. Video signal output section 18 performs D/A conversion on the voice signals subjected to the signal band compression processing to output to an external.

Video retrieval index formation section 21 forms a video retrieval index table using the video retrieval index data provided from complex data read processing section 14. Storage circuit 23 temporarily stores the formed index table.

Meanwhile key word input section 19 receives a key word input from an external. Key word pattern conversion section 20 converts the input key word into a phoneme code sequence, and further converts the sequence into pattern data used in pattern collation. Key word pattern collation section 22 performs pattern collation of the time series of the characteristic pattern data of the key word with the time series of the characteristic pattern data in the video retrieval index table read from storage circuit 23. The video reproduction apparatus as described above is comprised of, for example, a microcomputer incorporated device or dedicated LSI circuits.

The following explains the operation of this apparatus.

When control signal input section 1 receives a control signal instructing video reproduction from an external input device such as a remote control device or keyboard, the section 1 converts the control signal into a signal of format adapted to the apparatus, and issues a video recording instruction signal to video reproduction control section 13. Video reproduction control signal 13 receives the video recording instruction signal, and instructs complex data read processing section 14 to start video recording, for example, with time information indicative of a head of video signals.

Complex data read processing section 14 receives the instruction for starting the video reproduction, and using the instructed time information, determines respective read positions of the video signals and voice signals, each in advance subjected to the signal band decompression processing such as the MPEG, stored in video storage medium 9 in predetermined recording format such as the DVD. The section 14 issues a control signal instructing, for example, seek to respective read positions of the video signals and voice signals, to storage medium operation control section 8, and reads the video signals and voice signals from video storage medium 9 while maintaining time synchronization.

The video signals read by complex data read processing section 14 are provided to video signal decoding section 17. The section 17 performs the signal band compression processing such as the MPEG on the provided signals to provide to video signal output section 18. The section 18 performs D/A conversion on the provided signals to convert into, for example, NTSC analog signals, and outputs the signals to an external device such as a television monitor.

Similarly the voice signals read by complex data read processing section 14 are provided to voice signal decoding section 16. The section 16 performs the signal band compression processing such as the MPEG on the provided signals to provide to voice signal output section 16. The section 16 performs D/A conversion on the provided signals to convert into analog voice signals, and outputs the signals to an external device such as a speaker.

When control signal input section 1 receives the control signal instructing video reproduction from an external input device such as a remote control device or keyboard, the section 1 converts the control signal into the signal of format adapted to the apparatus, and issues a video retrieval instruction signal to video reproduction control section 13.

Video reproduction control signal 13 receives the video retrieval instruction, and issues a control signal instructing to input a key word to key word input section 19.

When key word input section 19 receives the key word input from the external input device such as a keyboard, the section 19 notifies video reproduction control section 13 that input of the key word is completed, and outputs the input key word information to key word pattern conversion section 20.

Video reproduction control section 13 receives the notification that input of the key word is completed, and initializes a key word detected position management table provided inside video reproduction control section 13 to manage time information indicative of a key word detected position in video signals. Then the section 13 issues an instruction for reading the video retrieval index data to complex data read processing section 14, and further issues another instruction for starting pattern collation to key word pattern collation section 22. At this point, when used as video storage medium 9 is a storage medium that ensures high accessibility such as a memory card, HDD or optical disk, normal video replay is continued, while when used as video storage medium 9 is a storage medium without the high accessibility such as a magnetic tape, the normal video replay is once halted.

Key word pattern conversion section 20 receives the key word information, converts the key word into a phoneme code sequence, and further converts the phoneme code sequence of the key word into the time series of voice characteristic pattern data corresponding to subwords composing the key word, referring to the standard voice pattern comprised of the time series of characteristic pattern data of each subword registered in advance in the section 20, to output to key word pattern collation section 22.

Herein the data used as the standard voice pattern and the time series of voice characteristic pattern data is, as well as the voice characteristic pattern data used in the above-mentioned fourth and fifth embodiments, the time series of vector data with N (N is an arbitrary natural number) components comprised of acoustic characteristic amounts generally used in voice recognition processing, such as short-term spectral data or logarithmic value of spectra at a human voice frequency band, and logarithmic energy of the voice signals per unit time.

Meanwhile complex data read processing section 14 receives the instruction for reading the video retrieval index data, from video reproduction control section 13, issues a control signal instructing, for example, seek to a read position of the video retrieval index data and high-rate read to storage medium operation control section 8, reads the video retrieval index data stored in video storage medium 9 in the predetermined recording format at the high rate, and outputs the read video retrieval index data sequentially to video retrieval index formation section 21.

The video retrieval index data is made of packets per predetermined unit time in the method as described in the fourth or fifth embodiments, and is the time series data comprised of voice characteristic pattern data, visual characteristic pattern data or phoneme similarity table obtained by collating the time series data for each subword, with a type of index data and time information synchronous with the video signal and voice signal added to each packet.

Video retrieval index formation section 21 reconstructs the video retrieval index data output from complex data read processing section 14 into the above-mentioned unit packet, and writes the reconstructed index structure packet in storage circuit 23 having FIFO (fast-in/fast-out) memory structure or circulating memory corresponding to a time length sufficient to collate key word, for each type of index data with the time series maintained. Then whenever key word pattern collation section 22 reads and discards the index structure packet from temporary storage circuit 23, video retrieval index formation section 21 writes a newly output and formed index structure packet in an available area in storage circuit 23. In addition, when video retrieval index formation section 21 detects a final portion of the index data, the section 21 notifies key word pattern collation section 22 that the read of index is completed.

Meanwhile key word pattern collation section 22 receives the instruction for starting the pattern collation from video reproduction control section 13, and initializes internal processing and storage circuit 23. Then the section 22 receives the time series of voice characteristic pattern data of the key word output from key word pattern conversion section 20, and collates the time series of voice characteristic pattern data in the index structure packet arranged in the order of time in storage section 23 by video retrieval index formation section 21 with a time interval sufficient for the pattern collation maintained, with the time series of voice characteristic pattern data of the received key word.

In the pattern collation, key word pattern collation section 22 expands or contracts a collation interval using, for example, the DP collation method, within a predetermined time interval in the time series of the voice characteristic pattern data in the index structure packet arranged in the order of time in storage section 23, and obtains a collation interval, as a detected interval of the key word, that obtains a predetermined degree of similarity that is a sum of similarities of respective voice characteristic pattern data when the time series of the voice characteristic pattern data is formed as the key word.

In collating the patterns, key word pattern collation section 22 uses the time series pattern collation such as the DP collation method, and iterates the collation, while sequentially reading and discarding the collated index structure packet in storage circuit 23 to update. Whenever the section 22 obtains the predetermined degree of similarity at a collation iterated step, the section 22 notifies video reproduction control section 13 of the time information, as a key word data detected position, which is contained in the index structure packet with first voice characteristic pattern data in the time series of the voice characteristic pattern data. In addition, in the case where key word pattern collation section 22 receives the notification that the read of the index is finished from video retrieval index formation section 21, the section 22 completes the collation processing of voice characteristic pattern data in the index structure packet left in storage circuit 23, and notifies video reproduction control section 13 that the key word collation is finished.

When video reproduction control section 13 receives first time information indicative of the key word detected position from key word pattern collation section 22, the section 13 once stores the received time information at a head of the key word detected position management table stored internally, and issues an instruction for reproducing video based on the received time information to complex data read processing section 14. Then the apparatus performs the same processing as the normal video replay, and outputs the video signals and voice signals from a position of the time information indicative of the key word detected position to an external of the apparatus.

When video reproduction control section 13 receives second and more time information indicative of the key word detected position, the section 13 sequentially stores the received time information from a second position from the head position in the key word detected position management table. Then only in the case where an instruction indicative of reproducing a next candidate is input from the external to the section 13 through control signal input section 1, the section 13 fetches the time information sequentially from the key word detected position management table, issues the instruction for reproducing video from a designated time position to complex data read processing section 14. Then the apparatus performs the same processing as the normal video replay, and outputs the video signals and voice signals from a position of the time information indicative of the key word detected position to an external of the apparatus.

Video reproducing control section 13 maintains contents of the key word detected position management table even after receiving the notification indicative of finish of key word collation from key word pattern collation section 22. Therefore whenever receiving a next candidate reproduction instruction from the external after finishing the key word pattern collation processing, the section 13 is capable of fetching the time information sequentially from the key word detected time management table, and issuing the instruction for reproducing video from the instructed time position to complex data read processing section 14. The key word detected position management table is initialized when a new key word is input from an external for a next video retrieval instruction from the external.

This apparatus iterates the above-mentioned sequence of operations whenever receives a video retrieval instruction with a key word from an external, and thereby is capable of specifying a video scene by the key word collation with voice information of a video program, and quickly reproducing the video from a specified position.

In the above explanation, the index structure packet data is the time series of voice characteristic pattern data. Further it may be possible to adopt a constitution where key word pattern collation section 22 performs pattern collation using a subword sequence of an input key word and the similarity per subword basis in the above-mentioned phoneme similarity table. In this case, key word pattern conversion section 20 converts a key word output from key word input section 19 into a phoneme code sequence of the key word to output to key word pattern collation section 22.

When key word pattern collation section 22 receives an instruction for starting pattern collation from video reproduction control section 13, the section 22 initializes internal processing and storage section 23. Then the section 22 receives the phoneme code sequence of the key word output from key word pattern conversion section 20, and collates the time series of phoneme similarity table data in the index structure packet arranged in the order of time in storage section 23 by video retrieval index formation section 21 with a time interval sufficient for the pattern collation maintained, with the time series of phoneme code sequence of the received key word.

In the pattern collation, key word pattern collation section 22 expands or contracts a collation interval using, for example, a time expansion and contraction used in the DP collation method, within a predetermined time interval in the time series of the phoneme similarity table data in the index structure packet arranged in the order of time in storage section 23, and obtains a collation interval, as a detected interval of the key word, that obtains a predetermined degree of similarity that is a sum of similarities of respective subwords when the time series of the phoneme sequence is formed as the key word.

That is, key word pattern collation section 22 fetches index structure packets each with an interval length sufficient for pattern collation from the phoneme similarity table with the same time width as a recorded video, and arranges voice characteristic pattern data items (with beginning time, ending time and similarity) of the fetched index structure packets in the order of time. Voice characteristic pattern data corresponding to the number of all standard voice patterns (subwords) are arranged on the same time axis at an interval in the phoneme similarity table. The columns of the voice characteristic pattern data are arranged successively corresponding to the number of intervals with an interval length sufficient for the pattern collation. Key word pattern collation section 22 collates time series of the voice characteristic pattern data of thus obtained video retrieval index with the time series of the voice characteristic pattern data composing the key word, while expanding or contracting a collation interval using the DP collation method, and sets a collation interval with a similarity between both time series higher than a predetermined level to be a detected interval of the key word. The similarity between both time series is obtained by fetching voice characteristic pattern data of the index structure packet in the order of subword sequence composing the key word, and adding similarities of the fetched voice characteristic pattern data.

The beginning time of the head subword in the key word detected interval is notified to video reproduction control section 13 as the key word detected position every time.

According to the pattern collation method as described above, since it is not necessary to perform collation processing between vector data comprised of acoustic property components such as the time series of voice characteristic pattern data in pattern collation processing, it is possible to largely reduce a collation processing time.

Further since the video retrieval index is not held in a fixed form corresponding to a registered key word, but stored in an intermediate form of a phoneme similarity table of an input voice, it is not necessary to register retrieval key words in advance, and to retrieve a video accurately reflecting a retrieval purpose even in the case where a user inputs an uncertain key word.

Furthermore it may be possible to adopt a constitution where the key word pattern conversion section converts an input key word into visual characteristic pattern data, and the above-mentioned key word pattern collation section uses the visual characteristic pattern data at the time of human vocalizing as described in the fifth embodiment, as the video retrieval index stored in advance in a storage medium, and collates the above-mentioned visual data with visual characteristic pattern data of an input key word, as follows:

In this case, key word pattern conversion section 20 converts key word information output from key word input section 19 into a phoneme code sequence, and further converts the phoneme code sequence of the key word into time series of voice characteristic pattern data and time series of visual characteristic pattern data each corresponding to subwords composing the key word, referring to phoneme standard patterns comprised of the time series of voice characteristic pattern data of respective subwords and visual characteristic standard patterns comprised of visual characteristic pattern data of respective vocalized subwords each registered in advance in the section 20, to output to key word pattern collation section 22.

Key word pattern collation section 22 receives the instruction for starting the pattern collation from video reproduction control section 13, and initializes internal processing and storage circuit 23. Then the section 22 receives the time series of voice characteristic pattern data and the time series of visual characteristic pattern data of the key word output from key word pattern conversion section 20, and performs the pattern collation using time series data in respective index structure packets in storage circuit 23 for each data type. Storage circuit 23 stores the index structure packets comprised of the voice characteristic pattern data, and the index structure packets comprised of the visual characteristic pattern data, each arranged in the order of time by video retrieval index formation section 21.

In each pattern collation, key word pattern collation section 22 expands or contracts a collation interval using, for example, the DP collation method, within a predetermined time interval in the time series of the respective characteristic pattern data in the index structure packets arranged in the order of time in storage section 23 to perform the pattern collation of the time series of respective characteristic pattern data of the key word, and obtains a sum of similarities between the characteristic pattern data of respective subwords for each data type to set to at a respective key word similarity.

Key word pattern collation section 22 sets as a detected interval of the key word a collation interval that obtains a predetermined degree of similarity that is a sum of the thus obtained key word similarity in collating the time series of voice characteristic pattern data and key word similarity in collating the time series of visual characteristic pattern data. Then the section 22 every time notifies video reproduction control section 13 of the time information, as a key word data detected position, which is contained in the index structure packet with first voice characteristic pattern data in the time series of the voice characteristic pattern data in the detected interval.

Thus the pattern collation is performed using both the voice characteristic pattern data from a voice, and the visual characteristic pattern data from a video. Therefor, for example, even in the case of decreased accuracy of acoustic property data composing the voice characteristic pattern data in the index structure packet due to BGM (Background Music) or noise in a recorded video program, it is possible to prevent key word detection accuracy from decreasing largely by using the visual characteristic pattern data.

Further it may be possible to adopt a constitution where the key word input section is provided with a microphone for use in inputting a voice, and the key word pattern conversion section converts a voice signal of an input key word into the voice characteristic pattern data of the key word, as follows:

When key word input section 19 receives a key word input from an external voice input device such as a microphone, the section 19 notifies video reproduction control section 13 that input of the key word is completed, and performs A/D conversion on the input key word voice signal to provide to key word pattern conversion section 20.

Key word pattern conversion section 20 performs FFT (Fast Fourier Transform) on the input key word voice signal per unit time, extracts the acoustic property data at a human voice frequency band, and generates the time series of voice characteristic pattern data comprised of vector data with N (N is an arbitrary natural number) components comprised of acoustic characteristic amounts generally used in voice recognition processing, such as short-term spectral data or logarithmic value of spectra at the extracted frequency band, and logarithmic energy of the voice signals per unit time.

It is thus possible to input a key word with a voice using, for example, a microphone, and generate the time series of voice characteristic pattern data required for the key word collation from the input voice signal.

Further it may be possible to adopt a constitution where the key word input section is provided with a microphone and camera device for use in inputting a moving video, and the above-mentioned key word pattern conversion section collates a video signal input when a user vocalizes a key word with lip image characteristic patterns registered in advance for each vocalized sound, and converts the video signal when the user vocalizes the key word into the visual characteristic pattern data of the key word, as follows:

In this case, when key word input section 19 receives key word information input from an external voice input device such as a microphone and video camera device, the section 19 notifies video reproduction control section 13 that input of the key word is completed, and processes A/D conversion on the input key word voice signal and video signal of a user's face when the user vocalizes the key word to provide to key word pattern conversion section 20.

Key word conversion section 20 generates, from the input key word voice signal, the time series of voice characteristic pattern data comprised of vector data with N (N is an arbitrary natural number) components comprised of acoustic characteristic amounts generally used in voice recognition processing. Further the section 20 detects a portion of a human lip area and extracts a lip area image for each image frame of the input key word video signal, using lip characteristic standard patterns fetched from the lip area images of some person registered in advance, further extracts the visual characteristic pattern data at the time of human vocalizing, which is comprised of information representative of a form of a lip, from the extracted lip area image, and generates the time series of visual characteristic pattern data corresponding to a key word vocalized time. The section 20 outputs both time series data to key word pattern collation section 22.

One example of the visual characteristic pattern data is vector data with components corresponding to the number divided image blocks, where each component is comprised of color mean data or luminance mean data of each image block, used in extracting the lip area image, obtained by dividing a lip area image space into an arbitrary number blocks. Another example is vector data with 4 numerical components obtained by further extracting only a lip portion from the lip area image data extracted as the visual characteristic, using, for example, a color filter, and calculating respective relative distances of two points each circumscribing a lip outer boundary in vertical direction (upper and lower) and of two points each circumscribing the lip outer boundary in a horizontal direction, each from an area centroid point of the lip portion.

It is thus possible to input a key word with a video and voice using a microphone and video camera device, and generate both the time series of voice characteristic pattern data of the key word from the input voice signal, and the time series of video characteristic pattern data of the key word from the input video signal.

Further the scene retrieval system of the present invention is applicable to a scene retrieval for only voice. According to the above-mentioned method, video signals, voice signals and video retrieval indexes, or voice signals and voice/video retrieval indexes are stored in a storage medium. It may be possible to use the voice/video retrieval index with the same structure as that of the above-mentioned video retrieval index. It may be possible to start retrieving a voice signal from a position corresponding to a beginning time of a head subword in a key word detected interval.

This application is based on the Japanese Patent Applications No.HEI10-359414 filed on Dec. 17, 1998, and HEI11-352819 filed on Dec. 13, 1999, entire contents of which are expressly incorporated by reference herein.

Industrial Applicability

By using voice recognition techniques separately at the time of video recording and at the time of video reproducing, it is possible to perform fast video retrieval using an arbitrary key word at the time of video reproducing, and to achieve quick reproduction of a scene in accordance with a user's purpose of retrieving.

Further since the video retrieval indexes are automatically generated concurrently with video recording, it is expected to largely reduce labors, which are manually performed conventionally, required for indexing operations with the purpose of arranging and reusing videos. Therefore the present invention has advantages in fields such as from specialized reproduction function using a digital video camera or digital video tape recorder in homes to video signal base construction and video retrieval/view in large-scale digital video library systems.

Brief Statement Under Article 19(1)

Claims 1, 12, 13 and 27 clarify that indexes are generated in advance per subword basis, and in retrieving, a voice interval of a key word is obtained from a combination of indexes per subword basis corresponding to the key word.

Cited reference 1 (JP, 3-53379, A) relates to index generation with voice recognition per word basis.

Cited reference 2 (Niimi, Yasunaga, Information Science Lecture E.19.3 Voice Recognition, (JP), Kyoritsu Syuppan, (10.10.79) pages 90 to 93) relates to recognition using subword lattices in voice recognition.

Cited reference 3 (JP, 6-68168, A, paragraph numbers [0018] to [0019], drawing [FIG. 3]) relates to index generation with voice recognition per word basis, retrieval by referring to the indexes.

Cited reference 4 (JP, 5-108727, A) relates to performing retrieval by inputting and outputting a voice in inputting and outputting an image, and further performing remote control using a preexisting facsimile.

The present invention provides effects that it is possible to cope with any key word and perform fast retrieval in retrieving, by generating indexes per subword basis, and further to transmit the indexes that does not require manual operation, by completely separating generation of the indexes and retrieval of the indexes.

We claim:

1. A video retrieval apparatus comprising:

a retrieval data generator that is configured to extract a characteristic pattern from a voice signal synchronous with a video signal to generate indexes for video retrieval; and a retrieval processor that is configured to input a key word from a retriever and collate the key word with the indexes to retrieve a desired video;

wherein said retrieval data generator includes a multiplexor that is configured to multiplex video signals, voice signals and indexes to output in data stream format; and wherein said retrieval processor includes a demultiplexor that is configured to demultiplex the multiplexed data stream into the video signals, the voice signals and the indexes.

2. The video retrieval apparatus according to claim 1, wherein collating extracts the indexes corresponding to subwords contained in the input key word from a phoneme similarity table comprised of indexes generated over an interval of the voice signal to be retrieved, converts the extracted indexes into the time series data to reconstruct the key word, and adds similarities for each reconstructed key word.

3. The video retrieval apparatus according to claim 1, wherein said retrieval data generator transmits the video signal, the voice signal and the indexes to said retrieval processor through a transmission medium.

4. The video retrieval apparatus according claim 3, wherein said transmission medium is either of a broadcast network, a communication network, or a storage medium.

5. The video retrieval apparatus according to claim 1, wherein said multiplexor divides the indexes into units that are brought into coincidence with unit GOP (Group of Videos) of corresponding video signals.

6. The video retrieval apparatus according to claim 5, wherein a time code of the video signal corresponding to the unit of the indexes is recorded as time synchronization information between the video signals, the voice signals and the indexes.

7. The video retrieval apparatus according to claim 6, wherein the time code recorded in the unit of the indexes includes a beginning time and a duration time of the video signal corresponding to the unit.

8. A video retrieval apparatus comprising:

a retrieval data generator that is configured to extract a characteristic pattern from a voice signal synchronous with a video signal to generate indexes for video retrieval; and a retrieval processor that is configured to input a key word from a retriever and collate the key word with the indexes to retrieve a desired video, said retrieval processor including a receiver that is configured to receive the key word from a retrieval terminal connected through a communications network, and said retrieval processor further including a transmitter that is configured to transmit a retrieved video signal to the retrieval terminal through the communications network;

wherein said retrieval data generator includes a multiplexor that is configured to multiplex video signals, voice signals and indexes to output in data stream format; and wherein said retrieval processor includes a demultiplexor that is configured to demultiplex the multiplexed data stream into the video signals, the voice signals and the indexes.

9. A voice retrieval apparatus comprising:

a retrieval data generator that is configured to extract a characteristic pattern from a voice signal to generate indexes for voice retrieval; and a retrieval processor that is configured to input a key word from a retriever and collate the key word with the indexes to retrieve a desired voice;

wherein said retrieval data generator includes a multiplexor that is configured to multiplex video signals, voice signals and indexes to output in data stream format; and wherein said retrieval processor includes a demultiplexor that is configured to demultiplex the multiplexed data stream into the video signals, the voice signals and the indexes.

10. A video reproduction apparatus that performs reproduction of video signals, said apparatus comprising:

a storage medium that stores video signals and that stores video retrieval indexes generated based on an input voice;

a key word pattern converter that is configured to convert a key word input from a retriever into pattern collation data; and a key word pattern collator that is configured to collate the pattern collation data of the key word with pattern collation data in the video retrieval indexes of a video program stored in said storage medium;

wherein said key word pattern converter converts the input key word into visual characteristic pattern data; and wherein said key word pattern collator collates the visual characteristic pattern data of the input key word with visual characteristic pattern data of the video signals at the time a person vocalizes a sound as the video retrieval indexes stored in said storage medium.

11. The video reproduction apparatus according to claim 10, wherein said apparatus further comprises a microphone for use in inputting a voice, and said key word pattern converter converts a voice signal of the key word input from said microphone into voice characteristic pattern data.

12. The video reproduction apparatus according to claim 10, wherein said apparatus further comprises a microphone and a camera apparatus for use in inputting a moving video, and said key word pattern converter collates a video signal input from the storage medium at the time a user vocalizes a key word with lip image characteristic pattern pre-registered for each vocalized sound, and converts the video signal at the time the user vocalizes the key word into visual characteristic pattern data of the key word.

* * * * *